United States Patent
Willert et al.

(10) Patent No.: US 6,196,369 B1
(45) Date of Patent: *Mar. 6, 2001

(54) ACTUATING DEVICE FOR THE ACTUATION, IN PARTICULAR PNEUMATIC ACTUATION OF A FRICTION CLUTCH

(75) Inventors: Jörg Willert, Schweinfurt; Joachim Lindner, Hambach, both of (DE)

(73) Assignee: Mannesmann Sachs AG, Schweinfurt ( * ) Notice: Subject to any disclaimer, the term of this patent is extended or adjusted under 35 U.S.C. 154(b) by 0 days.

This patent is subject to a terminal disclaimer.

(21) Appl. No.: 09/226,313

(22) Filed: Jan. 7, 1999

(30) Foreign Application Priority Data

Jan. 7, 1998 (DE) ............................... 198 00 220

(51) Int. Cl.⁷ ............................ F16D 19/00; F16D 25/00
(52) U.S. Cl. ................ 192/85 R; 192/85 C; 192/85 CA
(58) Field of Search ............................ 192/85 CA, 85 C, 192/85 R, 91 A, 91 R

(56) References Cited

U.S. PATENT DOCUMENTS

| | | | |
|---|---|---|---|
| 4,796,739 | * 1/1989 | Jonner et al. | 192/13 R |
| 5,474,165 | * 12/1995 | Doremus | 192/85 CA |
| 5,950,788 | * 9/1999 | Willert et al. | 192/85 CA |
| 6,029,789 | * 2/2000 | Lindner et al. | 192/85 CA |

FOREIGN PATENT DOCUMENTS 2 323 906   10/1998   (GB).
2 327 249   1/1999   (GB).

* cited by examiner

*Primary Examiner*—Charles A Marmor
*Assistant Examiner*—Tisha D. Waddell
(74) *Attorney, Agent, or Firm*—Cohen, Pontani, Lieberman & Pavane

(57) ABSTRACT

An actuating device for a friction clutch arranged in the drive train of an automobile between an internal combustion engine and a gear in a casing bell. The actuating device includes a disengagement bearing arrangement and a positioning servo arrangement, having a pressure-medium power cylinder arrangement, for the disengagement bearing arrangement, the positioning servo arrangement having a control valve connected to a pressure-medium source. The control valve includes a valve arrangement which can be changed over between at least two control states as a function of an actual value representing the axial position of the disengagement bearing arrangement and of a command variable representing a desired position of the disengagement bearing arrangement. In a first controlled state, there is a pressure-medium connection between the pressure-medium power cylinder arrangement and the pressure-medium source, and, in a second control state, there is a pressure-medium connection between the pressure-medium power cylinder arrangement and a pressure equalizing orifice. The valve arrangement includes two valve elements movable relative to one another and relative to a valve housing. The command variable is represented by the position of a first of the two valve elements and the actual value by the position of a second of the two valve elements relative to the valve housing, and a difference quantity assigned to the actual value and to the command variable is represented by the position of the two valve elements relative to one another.

69 Claims, 18 Drawing Sheets

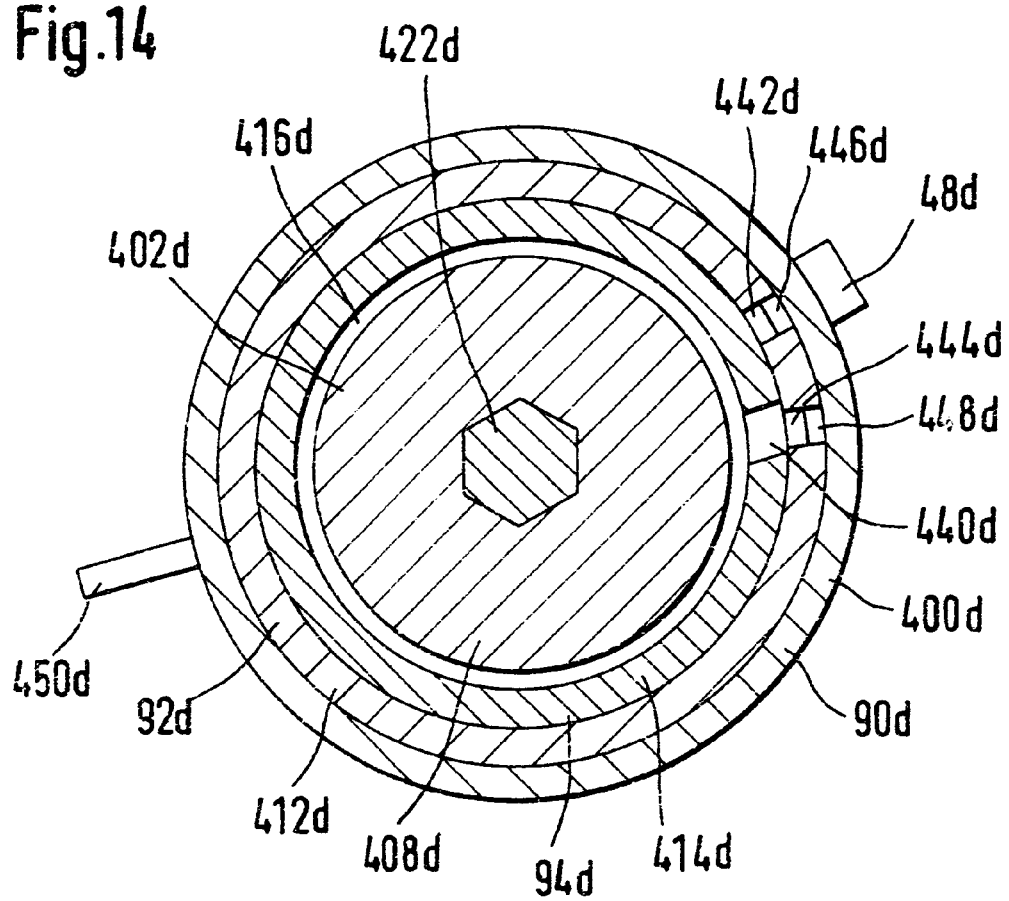

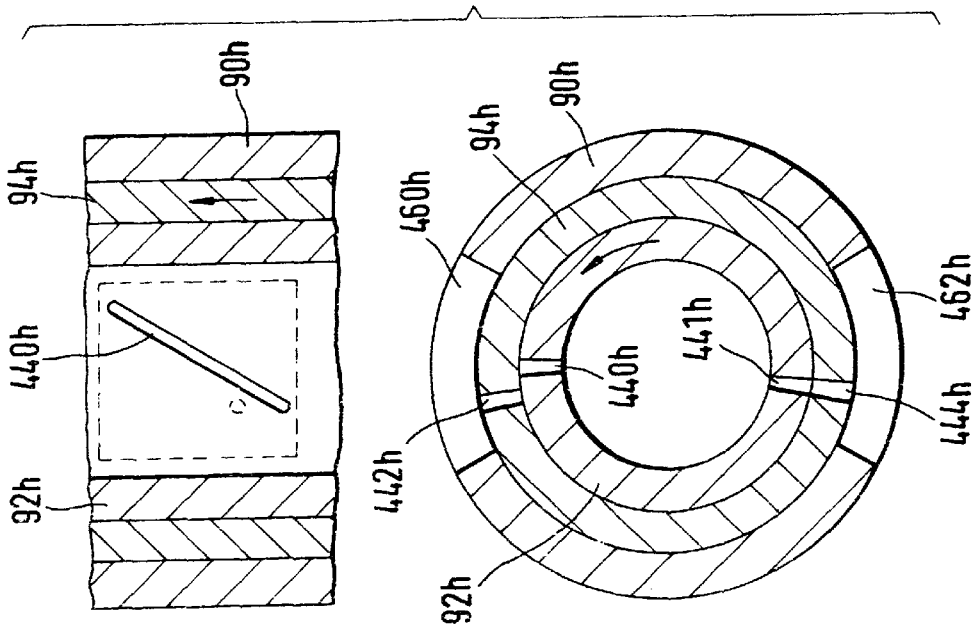
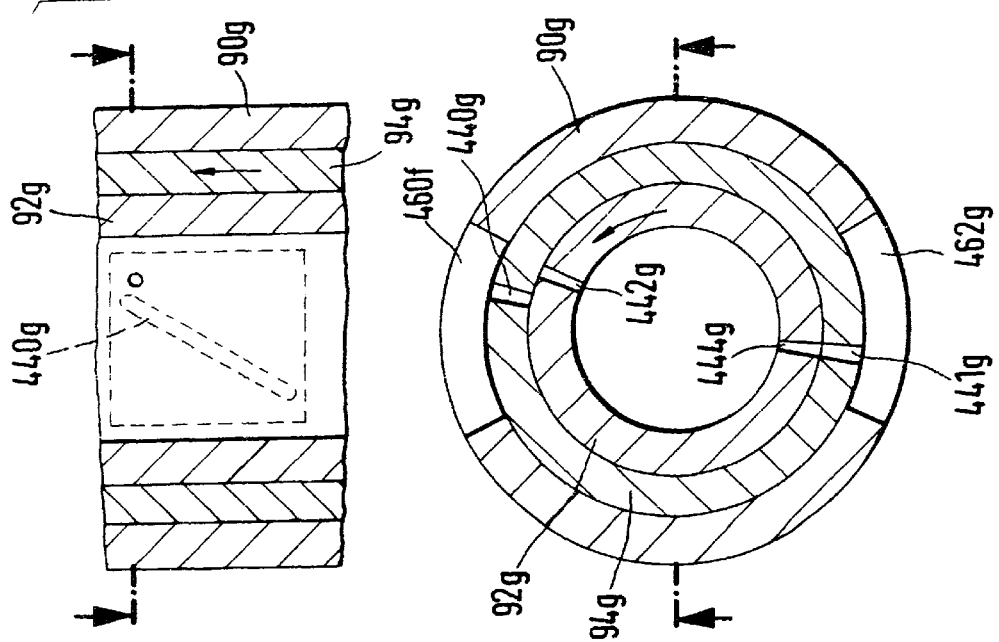

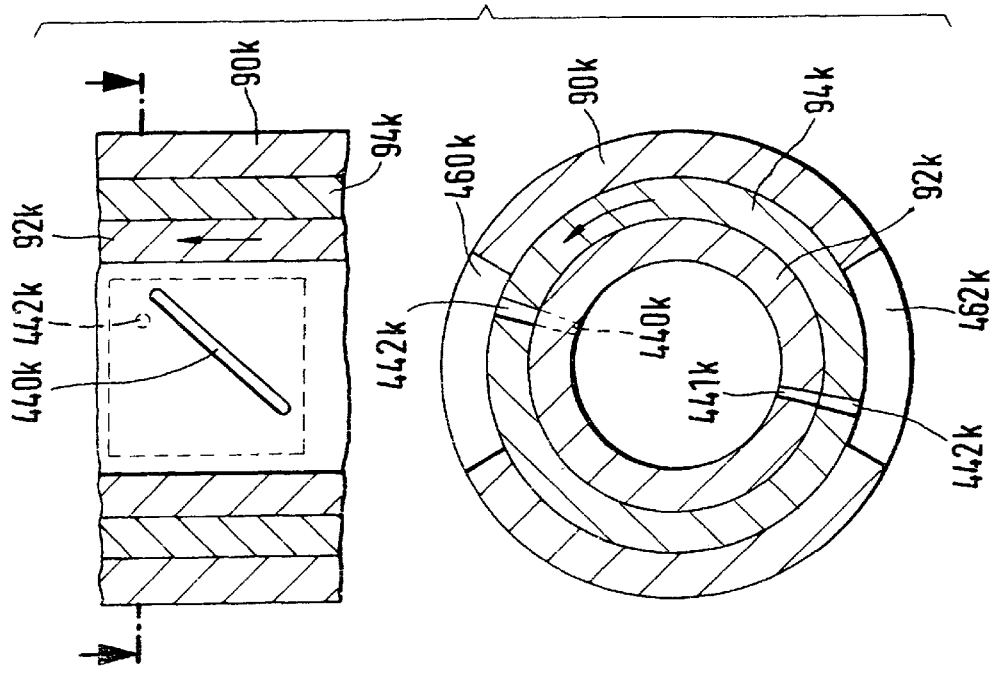
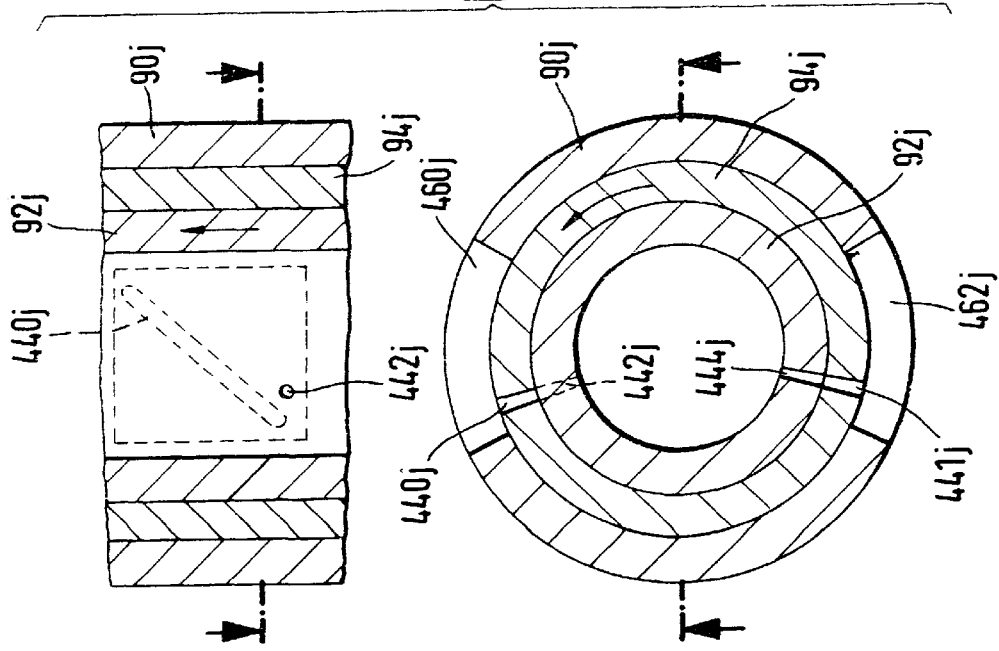

ACTUATING DEVICE FOR THE ACTUATION, IN PARTICULAR PNEUMATIC ACTUATION OF A FRICTION CLUTCH

BACKGROUND OF THE INVENTION

1. Field of the Invention

The invention relates to an actuating device for a friction clutch arranged in the drivetrain of an automobile, in particular a utility automobile, between an internal combustion engine and a gear of a casing bell, said actuating device comprising a disengagement bearing arrangement for actuating the friction clutch, said disengagement bearing arrangement being movable essentially coaxially to the friction clutch, and a positioning servo arrangement with a pressure-medium power cylinder arrangement which acts on the disengagement bearing arrangement and can be actuated via a control valve, connected to a pressure-medium source, as a function of a command variable representing a desired position and of an actual value representing the axial position of the disengagement bearing arrangement.

2. Discussion of the Prior Art

An actuating device of this type is known, for example, from DE 33 21 578 C2. The known actuating device has a vacuum booster as a positioning servo arrangement. The booster constructed in the manner of a vacuum brake booster is designed integrally with a pneumatic power cylinder and a control valve and is arranged outside the casing bell. Two working chambers of the pneumatic power cylinder are separated from one another by an axially movably guided piston and an elastic diaphragm. One working chamber, designed as a vacuum chamber, is connected to an intake line system of the internal combustion engine. The other working chamber, serving as a control chamber, can be connected by means of the control valve either to the vacuum chamber or, via a pressure equalizing orifice, to the atmosphere. The vacuum booster is actuated via a control rod which butts against a valve body of the control valve and which can be displaced axially via an electromotively driven cam. Axial displacement of the control rod results in the control valve being switched in such a way that the piston follows the movement of the control rod with power assistance. The movement of the piston acts via a hydraulic master cylinder on a slave cylinder which is connected to the master cylinder and is arranged outside the casing bell and which, in turn, acts on a disengagement fork assigned to the disengagement bearing arrangement. Emergency actuation of the clutch when the internal combustion engine is stationary, that is to say in the absence of a vacuum, is possible due to the fact that the control rod can act directly on the piston via the valve body of the control valve.

The control valve has a valve body which cooperates with an elastic valve seat. Provided in the valve seat is a connecting duct, via which the connection is made between the control chamber and the ambient air, insofar as the valve body is not pressed against the elastic valve seat in order to close the connecting duct by means of the valve body. A further connecting duct connects the control chamber to the vacuum chamber.

Furthermore, an actuating device of the type initially mentioned, which has a pneumatic power cylinder as a pressure-medium power cylinder arrangement, is known. The actuating device is mounted, as an integral unit comprising the pneumatic power cylinder, a hydraulic slave cylinder and the control valve, externally on the casing bell. The piston of the pneumatic power cylinder is mounted on a rod element forming the piston of the hydraulic slave cylinder, and the rod element is connected to a tappet which reaches into the interior of the casing bell and which engages on a disengagement fork assigned to the disengagement bearing arrangement. A master cylinder actuable by the clutch pedal and a control inlet of the control valve are connected to the hydraulic slave cylinder. The control valve controls the supply of compressed air into the pneumatic power cylinder and the bleeding of air from the pneumatic power cylinder as a function of the hydraulic pressure prevailing at the control inlet, in such a way that a predetermined hydraulic pressure, defined by a compression spring arrangement, is established at the control inlet. In this case, the hydraulic slave cylinder serves as a measuring cylinder which records the position of the rod element and, consequently, indirectly the position of the disengagement bearing arrangement. When the master cylinder is actuated, forces are exerted directly on the rod element, and consequently on the disengagement bearing arrangement, via the hydraulic slave cylinder serving as a measuring cylinder, in addition to the actuating forces of the pneumatic power cylinder due to the supply of compressed air into the latter.

The intention is to put an actuating device of the initially specified type on the market, in which the pressure-medium power cylinder arrangement is arranged inside the casing bell. One possible variant is distinguished in that the pressure-medium power cylinder arrangement is designed to exert on the disengagement bearing arrangement a force which is essentially coaxial to the clutch axis. For this purpose, it is considered, for example, that the pressure-medium power cylinder arrangement should comprise an annular pressure-medium cylinder essentially concentric to the clutch axis.

In an arrangement of this type, it will be possible, in principle, to use a control valve of the type described above, with a hydraulic slave cylinder which serves as a measuring cylinder and by which forces are exerted on the disengagement bearing arrangement when the control valve is actuated. A disadvantage of this, however, would be that, in the case of a pressure-medium power cylinder arrangement designed to exert on the disengagement bearing arrangement a force which is essentially coaxial to the clutch axis, tilting moments are exerted on the disengagement bearing arrangement by the measuring cylinder, insofar as the latter is not also designed for exerting on the disengagement bearing arrangement forces which are essentially coaxial to the clutch axis, for example as an annular measuring cylinder essentially concentric to the clutch axis. An annular measuring cylinder of this type would have the disadvantage that, if the hydraulic measuring cylinder has leaks, an exchange of the measuring cylinder would make it necessary to release the casing bell from the internal combustion engine. If, on the other hand, a measuring cylinder arranged, for example, laterally to the pressure-medium power cylinder arrangement were used, the tilting moments then exerted on the disengagement bearing arrangement would require a correspondingly higher outlay in mechanical terms in order to absorb or compensate these tilting moments.

SUMMARY OF THE INVENTION

By contrast, one object of the present invention is to provide an actuating device of the type initially mentioned, with a pressure-medium power cylinder arrangement arranged inside the casing bell, in which device no appreciable forces, in particular tilting forces, are exerted by the control valve (and a measuring arrangement or the like assigned, where appropriate, to the control valve) on the disengagement bearing arrangement (apart from via the pressure-medium power cylinder arrangement by means of a pressure medium which is supplied).

Another object of the present invention is to provide an actuating device of the type initially mentioned, which allows simplified maintenance (regardless of whether the pressure-medium power cylinder arrangement is arranged inside or outside the casing bell) of the control valve or of components assigned to the latter.

In order to achieve at least one of these objects, it is proposed, according to the invention, that the control valve comprise a valve arrangement which is adjustable between a first control state, connecting the pressure-medium power cylinder arrangement to the pressure-medium source, and a second control state, connecting the pressure-medium power cylinder arrangement to a pressure equalizing orifice, and which can be changed over between the two control states as a function of a difference quantity assigned to the actual value and to the command variable, the valve arrangement comprising two valve elements movable relative to one another and relative to a valve housing, the command variable being represented by the position of a first of the two valve elements and the actual value by the position of a second of the two valve elements relative to the valve housing, and the difference quantity being represented by the position of the two valve elements relative to one another.

The design, according to the invention, of the control valve, with two valve elements, the positions of which in each case represent a separate quantity defining the control state of the control valve, allows uncoupling between the "actual value side" of the positioning servo arrangement, on the one hand, and the "command variable side" of the positioning servo arrangement, on the other hand, in such a way that, in the case of a variation in the command variable, no appreciable variable forces are exerted on the disengagement bearing arrangement from the "command variable side" of the positioning servo arrangement, apart from via the pressure-medium power cylinder arrangement by means of a pressure medium which is supplied. Nor are any appreciable tilting moments then exerted on the disengagement bearing arrangement from the "command variable side" of the positioning servo arrangement. There is therefore no need for any outlay in mechanical terms for absorbing or compensating tilting forces, with the result that the actuating device according to the invention can be produced more cost effectively.

Since the actual value and the command variable are represented in each case by the position of a specific valve element, it is possible to have an uncomplicated coupling of the control valve to a command variable encoder unit, on the one hand, and to an actual value encoder unit, on the other hand. The control valve can thus be designed for easy maintenance, for example in such a way that it can be exchanged without any appreciable outlay.

The valve arrangement may be adjustable, as a function of the difference quantity, in a third control state, in which the pressure-medium power cylinder arrangement is preferably closed off so as to be essentially pressure medium tight, that is to say is not connected at the same time either to the pressure-medium source or to the pressure equalizing orifice. The third control state is then assigned a specific position of the valve arrangement. However, the third control state may also be distinguished in that the valve arrangement alternately assumes the position corresponding to the first control state and the position corresponding to the second control state, so that the pressure-medium power cylinder arrangement is not closed off so as to be pressure medium tight.

It is proposed that the control valve have a first signal connection for receiving a command signal indicating the command variable, in particular from a clutch pedal arrangement, and a second signal connection for receiving an actual value signal indicating the actual value from an encoder element arrangement assigned to the disengagement bearing arrangement. Preferably, the command signal and the actual value signal then in each case act directly, in each case independently of the other signal, on exactly one valve element of the two valve elements specifically the command signal acts on the first valve element and the actual value signal acts on the second valve element. That the signals in each case act directly on precisely one valve element does not rule out the fact that the signals act on the respective valve element via intermediate components. The term "act directly" thus serves merely to make a distinction from "indirect" actions, in particular of the command signal on the second valve element via the positioning servo arrangement, in such a way that, specifically, an appropriate changeover of the control valve between the control states by means of the pressure-medium power cylinder arrangement ensures that the actual value is set according to the instruction by the command variable and the position of the second valve element representing the actual value also changes correspondingly.

The actual value signal may be a hydraulic, pneumatic, mechanical or electric signal represented, in particular, by a pressure, a volume, a force, a travel, an angle, a current intensity or a voltage, converter means for converting the actual value signal into the actual value being assigned, where appropriate, to the second signal connection. If a pneumatic or hydraulic actual value signal is to be converted, the converter means may comprise an, in particular spring-prestressed, piston which is preferably coupled or couplable to the second valve element, in particular is integral with the latter.

It is proposed that the positioning servo arrangement comprise a mechanical position regulating arrangement with a mechanically coupled or couplable encoder element which records the position of the disengagement bearing arrangement directly or indirectly. In this respect, it is preferred that the encoder element act on the second valve element, in particular be motionally coupled or motionally couplable to the latter. The second valve element may be coupled or couplable, preferably essentially rigidly, via a coupling element which, where appropriate, is integral with the latter, to the disengagement bearing arrangement or the disengagement bearing arrangement side of the pressure-medium power cylinder arrangement. It is also possible, however, for the second valve element to be coupled or couplable to the disengagement bearing arrangement or the disengagement bearing arrangement side of the pressure-medium power cylinder arrangement via a coupling element which is coupled preferably essentially rigidly to said valve element and, where appropriate, is integral with the latter and which is prestressed or prestressable against said disengagement bearing arrangement or disengagement bearing arrangement side of the pressure-medium power cylinder arrangement.

The command signal may be a hydraulic, pneumatic, electric or optical signal represented, in particular, by a pressure, a volume, a force, a travel, an angle, a current, a voltage or a light intensity, converter means for converting the command signal into the command variable being assigned, where appropriate, to the first signal connection. The command signal is preferably a pneumatic or hydraulic command signal, but most preferably a hydraulic command signal. It is proposed, in this respect, that the converter means for converting the pneumatic or hydraulic command signal comprise an, in particular, spring-prestressed piston which is preferably coupled or couplable to the first valve element, in particular is integral with the latter.

The valve arrangement may comprise, in addition to the first and the second valve element, an auxiliary valve element which is movable relative to the valve housing and/or relative to the two valve elements mentioned and which cooperates with the first and/or second valve element, in order to provide at least one of the control states.

According to an advantageous design of the actuating device according to the invention, at least one of the elements, namely the first valve element and second valve element, has a portion which forms a control edge and which cooperates with at least three pressure-medium orifices in the other valve element and in the valve housing, in particular one pressure-medium orifice in the other valve element and two pressure-medium orifices in the valve housing, in order, when the two valve elements are in at least one relative position, during a movement of the one valve element relative to the other valve element in one direction, by the movement of at least one control edge past at least one of the pressure-medium orifices, in particular the pressure-medium orifice in the other valve element, to break or make a first pressure-medium connection within the control valve, in particular the pressure-medium connection between the pressure-medium source and the pressure-medium power cylinder arrangement, and to make or break another pressure-medium connection within the control valve, in particular the pressure-medium connection between the pressure equalizing orifice and the pressure-medium power cylinder arrangement. In this design, an auxiliary valve element cooperating with the first and/or the second valve element and movable relative to the valve housing is preferably dispensed with. In principle, both valve elements may each have at least one portion forming a control edge; however, it is also possible for only either the first or the second valve element to have such a portion.

One of the valve elements, namely the first valve element and second valve element, may have at least one, in particular, studlike fitting portion which fits into an associated slotlike recess of the other valve element, the recess being delimited by a recess edge forming at least one stop, where appropriate with two stops delimiting the recesses at both ends, in order to delimit the range of movement of the two valve elements relative to one another. Insofar as the fitting portion or the recess does not have any other function, it is, in general, unimportant for the functioning of the control valve whether the first valve element or the second valve element has the fitting portion.

It is proposed, as particularly preferred, that the second valve element be coupled to the first valve element in such a way that, when the actuating device is in a basic state, without clutch actuation, the second valve element holds the first valve element in an initial position relative to the second valve element, said initial position preferably taking any clutch wear into account, in order, at the start of clutch actuation, to provide a defined response of the actuating device and/or at least to keep small, preferably avoid, any idle travel induced, in particular, by clutch wear. For this purpose, the two valve elements may have stops which cooperate in the initial position. Preferably, at least one fitting portion and the recess edge delimiting the recess serve as stops.

It is proposed, as particularly preferred, that (irrespective of the remaining design features), when the actuating device is in a basic state, without clutch actuation, the control valve assumes the control state connecting the pressure equalizing orifice to the pressure-medium power cylinder arrangement. If, in the case of a pressure-medium power cylinder arrangement designed as a pneumatic power cylinder arrangement, the cylinder arrangement is vented to the atmosphere via the pressure equalizing orifice, ambient pressure prevails within the cylinder arrangement when the actuating device is in the basic state, so that undesirable pressure variations within the cylinder arrangement due to external influences (for example, temperature) are ruled out.

It is proposed that the first and the second valve element be mounted in a recess of the valve housing, one of the valve elements being rotatable about a valve axis and the other valve element being either rotatable about the valve axis or displaceable along the valve axis, either the actual value and the command variable both being represented by a rotary position of the respective valve element or one of these quantities being represented by a rotary position and the other of these quantities by an axial position of the respective valve element.

Of the two valve elements, one valve element may have at least two separate pressure-medium passage orifices, of which one passage orifice is in pressure-medium passage connection with a first pressure-medium passage orifice of the valve housing in at least one position of this valve element relative to the valve housing and the other passage orifice is in pressure-medium passage connection with a second pressure-medium passage orifice of the valve housing in at least one position of this valve element relative to the valve housing. At least one further pressure-medium passage orifice is then provided in the other valve element, one pressure-medium passage orifice thereof being in pressure-medium passage connection with a third pressure-medium passage orifice of the valve housing in at least one position of this (the other) valve element relative to the valve housing.

In order to implement the control states of the control valve, it is proposed that, in a first relative position or in a first relative position range of the two valve elements, the one further pressure-medium passage orifice in the other valve element is in pressure-medium passage connection with one of the at least two separate pressure-medium passage orifices in the one valve element, and that, in a second relative position or in a second relative position range of the two valve elements, the one further pressure-medium passage orifice in the other valve element is in pressure-medium passage connection with another of the at least two separate pressure-medium passage orifices in the one valve element. This makes it possible to ensure that, in at least one position range of the two valve elements relative to one another and relative to the valve housing, a pressure-medium connection between the pressure-medium source and the pressure-medium power cylinder arrangement is made, and that, in at least one other position range of the two valve elements relative to one another and relative to the valve housing via associated pressure-medium passage orifices in the valve housing and in the two valve elements, a pressure-medium connection between the pressure-medium power cylinder arrangement and the pressure equalizing orifice is made via associated pressure-medium passage orifices in the valve housing and in the two valve elements.

Preferably, in a third relative position or in a third relative position range of the two valve elements, the one further pressure-medium passage orifice in the other valve element is not in pressure-medium passage connection with either of the at least two separate pressure-medium passage orifices in the one valve element. This makes it possible to ensure that, in at least one position of the two valve elements relative to one another and relative to the valve housing, neither a pressure-medium connection between the pressure-medium power cylinder arrangement and the pressure-medium source nor a pressure-medium connection between the pressure-medium power cylinder arrangement and the pressure equalizing orifice is made.

As regards the more detailed design of the control valve, it is proposed that, of the two valve elements, one valve element have an annular portion which is coaxial to the valve axis and which radially surrounds the other valve element of the two valve elements externally, at least in regions. Furthermore, the other valve element of the two valve elements may have an annular portion which is coaxial to the valve axis and which may radially surround an inner portion of the valve housing externally, at least in regions. The inner portion may have at least one pressure-medium passage orifice. Alternatively or additionally, the annular portion, coaxial to the valve axis, of the one valve element and/or the annular portion, coaxial to the valve axis, of the one valve element and/or a valve housing wall radially surrounding the one valve element externally and at least partially delimiting the recess of the valve housing may also have at least one respective pressure-medium passage orifice, said pressure-medium passage orifices cooperating in order to implement the valve control states and being correspondingly coordinated with one another in position, shape and size.

As already mentioned, the valve elements, in particular the first and the second valve element, may be mounted rotatably about a valve axis in a recess of the valve housing, the actual value and the command variable being represented by rotary positions of the respective valve element.

It has also already been mentioned that, of the elements, namely the first valve element and second valve element, one, in particular the second valve element, may have an annular portion which is coaxial to the valve axis and which radially surrounds the other valve element of the two valve elements externally, at least in regions. In this respect, it is particularly preferred that the annular portion of the one valve element, said annular portion being radially surrounded externally by a recess-delimiting inner circumferential surface of the valve housing, has, as pressure-medium passage orifices, at least two perforations which extend in the circumferential direction and are offset relative to one another in the circumferential direction and which are separated from one another by a respective portion of the annular portion and which are open radially inwardly and outwardly, that at least two in particular radially directed bores opening into the recess are provided in the valve housing as pressure-medium passage orifices, the opening orifices of the bores being offset relative to one another in the circumferential direction and in each case at least partially covering another of the perforations in at least one rotary position of the one valve element, and that at least one connecting duct is provided in the other valve element as a pressure-medium passage orifice, in particular a passage bore, said connecting duct being open to two of the perforations in at least one relative rotary position of the two valve elements, in particular in that the two opening orifices of the passage bore are at least partially covered in each case by another of the perforations.

Furthermore, in this respect, it is proposed, as particularly advantageous, that in each case exactly three bores, in each case exactly three perforations and exactly one connecting duct, in particular a radially extending passage bore, be provided, a pressure-medium connection between the pressure-medium source and the pressure-medium power cylinder arrangement being made in at least one rotary position range of the two valve elements relative to one another and relative to the valve housing via two of the bores, two of the perforations and the connecting duct, and a pressure-medium connection between the pressure-medium power cylinder arrangement and the pressure equalizing orifice being made in at least one other rotary position range of the two valve elements relative to one another and relative to the valve housing, via two of the bores, two of the perforations and the connecting duct.

The portions of the annular portion which separate the perforations from one another are preferably dimensioned in such a way that, in at least one relative rotary position of the two valve elements and/or in at least one rotary position of the one valve element relative to the valve housing, at least one duct orifice, in particular opening orifice of the passage bore in the other valve element and/or at least one of the opening orifices of the bores in the valve housing is closed by a respective portion of the annular portion, said portion forming, in particular, a control edge.

The last-mentioned measures make it possible, in a simple way, to ensure that, in at least one rotary position of the two valve elements relative to one another and relative to the valve housing, neither a pressure-medium connection between the pressure-medium power cylinder arrangement and the pressure-medium source nor a pressure-medium connection between the pressure-medium power cylinder arrangement and the pressure equalizing orifice is made. Thus, even without an additional auxiliary valve element movable relative to the housing, three control valve states, namely "pressure-medium connection between the pressure-medium source and the pressure-medium power cylinder arrangement", "pressure-medium connection between the pressure-medium power cylinder arrangement and the pressure equalizing orifice" and "essentially pressure medium tight closing off of the pressure-medium power cylinder arrangement", can be implemented by means of the first and the second valve element.

The opening orifices of the three bores in the valve housing are preferably arranged at a distance from one another at the same circumferential angle and preferably in each case cover an identical circumferential angle range. Accordingly, for the three perforations in the annular portion of the one valve element, it is preferred that these cover in each case an identical circumferential angle range and be arranged at a distance from one another at the same circumferential angle. Preferably, the opening orifices of the three bores and, correspondingly, the three perforations are not essentially offset relative to one another in the axial direction.

Of the three bores, preferably a bore assigned to the pressure equalizing orifice, a bore assigned to the pressure-medium source and a bore assigned to the pressure-medium power cylinder arrangement succeed one another in a predetermined direction of rotation, in the basic state of the actuating device an opening orifice of the passage bore in the first valve element being located approximately opposite the bore assigned to the pressure equalizing orifice, and a portion of the annular portion of the second valve element, said portion forming a control edge, being offset in the direction of rotation relative to the bore assigned to the pressure equalizing orifice, but being closely adjacent to said bore, and, for the actuation of the clutch, the first valve element being rotatable in the direction of rotation relative to the rotary position of the basic state, in particular at most approximately as far as a rotary position in which the opening orifice of the passage bore is located approximately opposite the bore assigned to the pressure-medium source.

The recess receiving the valve elements may be designed as a passage bore which runs preferably transversely to the direction of movement of the disengagement bearing arrangement and is located in the valve housing and at one end of which the first valve element is accessible, in particular projects, and at the other end of which the second valve element is accessible, in particular projects. In this respect, it is proposed, as particularly preferred, that an end portion of the second valve element, said end portion projecting from the passage bore in the valve housing, carry, as a coupling element, a rigidly coupled caliper which acts on the disengagement bearing arrangement or the disengagement bearing arrangement side of the pressure-medium power cylinder arrangement, in particular by spring means acting on the caliper and the valve housing, and preferably comprising a leg spring arranged around the end portion, is prestressed against said leg spring or is positively coupled to the latter (for example, by means of a long hole, into which a fitting portion of the caliper fits), so that the caliper is forcibly driven. A linear movement of the disengagement bearing arrangement or of the disengagement bearing arrangement side of the pressure-medium power cylinder arrangement can then be converted into a rotational movement of the second valve element via the caliper.

Insofar as converter means are provided for converting a pneumatic or hydraulic command signal, the spring-prestressed piston of the converter means may be part of a cylinder/piston arrangement separate from the valve elements, the piston being movable preferably in a direction which runs essentially transversely to the valve axis, and a linear movement of the piston being capable of being converted into a rotational movement of the first valve element via a coupling arrangement, in particular a toggle lever arrangement, acting on the first valve element.

As already mentioned, alternatively, the first and the second valve element may be mounted in a recess of the valve housing, one of the valve elements being rotatable about a valve axis and the other valve element being displaceable along the valve axis, one quantity of the actual value and the command variable being represented by a rotary position and the other quantity by an axial position of the respective valve element. This design is particularly advantageous insofar as, during coupling and uncoupling, the disengagement bearing arrangement executes a linear movement which can be converted in a simple way into a corresponding linear movement of the displaceable valve element representing the actual value. If a clutch pedal arrangement is provided, then a rotational movement of the clutch pedal may be picked up in a simple way and converted into a corresponding rotational movement of the rotational valve element representing the command variable. In this case, it would be particularly expedient to arrange the control valve on the clutch pedal. However, the control valve may also readily be arranged in the casing bell, in particular on the pressure-medium power cylinder arrangement. Irrespective of the location where the control valve is arranged, the displaceable valve element may also serve for representing the command variable and the rotatable valve element for representing the actual value.

The proposed control valve may have a comparatively short design, so that, in the case of arrangement on the pressure-medium power cylinder arrangement, said control valve may readily be arranged with its valve axis parallel to the direction of movement of the pressure-medium power cylinder arrangement. If, in this case, the displaceable valve element serves for representing the actual value, any force deflection may be dispensed with, so that the design outlay is reduced.

If, as preferred, one valve element has a control edge which cooperates with associated pressure-medium orifices in the other valve element and in the valve housing, then, by virtue of the relative movability of the two valve elements which comprises a translational and a rotational movement component, it is possible in a simple way to preset a characteristic line which indicates the relation between the degree of actuation of the clutch pedal, on the one hand, and the desired position or command variable, on the other hand. A corresponding characteristic line may be implemented, for example, in that one valve element has, as a pressure-medium passage orifice, a long hole which has a corresponding profile and which cooperates with associated pressure-medium passage orifices having dimensions which are markedly reduced in comparison with the extent of the long hole. A portion, delimiting the long hole, of the valve element and/or a portion, delimiting said remaining passage orifice, of the respective valve element may, in this case, be interpreted as a control edge. If the changeover between the control states takes place by the movement of such a control edge past an associated pressure-medium orifice, then this passing movement requires only comparatively low actuating force, so that the control valve is distinguished by a great lack of transverse force.

As regards the design of the control valve or of the valve elements, it is proposed that the first valve element have the annular portion which is coaxial to the valve axis and which radially surrounds the second valve element externally, at least in regions.

Furthermore, the valve element, in particular the first valve element, displaceable along the valve axis may be secured against rotation about the valve axis. The valve element, in particular the second valve element, rotatable about the valve axis may be secured against displacement along the valve axis. Securing against rotation or displacement ensures that the rotary position of the two valve elements relative to one another is determined solely by the rotary position of the rotatable valve element and the displacement position of the two valve elements relative to one another is determined solely by the displacement position of the displaceable valve element, thus ensuring a well-defined control behavior of the control valve.

One of the two valve elements, in particular the first valve element, may have, as pressure-medium passage orifices, at least two holes, in particular bores, offset relative to one another in the circumferential direction and/or in the axial direction. The other valve element then preferably has, as a pressure-medium passage orifice, at least one long hole which cooperates with the holes in order to implement the valve control states and which extends both in the circumferential direction and in the axial direction and runs preferably obliquely to an (imaginary) axially parallel generating line of this valve element.

It is proposed that the control valve, in particular the valve housing, and/or the first valve element and/or the second valve element, have pressure-medium guide means which ensure a pressure-medium passage connection between pressure-medium passage orifices, assigned to one another in pairs in the valve housing, on the one hand, and in one of the two valve elements, on the other hand, regardless of the position of these valve elements relative to the valve housing. In this case, the control states of the control valve are implemented essentially solely by the pressure-medium passage orifices or control edges of the two valve elements, and the pressure-medium passage orifices of the valve housing serve only for supplying pressure medium to the valve and, further, to the pressure-medium power cylinder arrangement and for bleeding pressure medium from the pressure-medium power cylinder arrangement via the control valve.

There are various possibilities for the design of the pressure-medium guide means. For example, the pressure-medium guide means may comprise at least one pressure-medium guide recess, running in the axial direction and/or in the circumferential direction, in surface portions of the valve housing, of the first valve element and of the second valve element which bear one on the other. The pressure-medium guide recess (or, in other words, the part having the pressure-medium guide recess) will then, as a rule, have a respective pressure-medium passage orifice (in the region of the pressure-medium guide recess), the pressure-medium guide recess being in pressure-medium passage connection with the pressure-medium passage orifice assigned in pairs to this pressure-medium passage orifice, regardless of the position of the respective valve element. Furthermore, the pressure-medium guide means may comprise at least one inner space which is formed in the control valve and is at least partially delimited by at least two elements of the valve housing, namely the first valve element and second valve element, and into which the pressure-medium passage orifices assigned to one another in pairs open, regardless of the position of the respective valve element.

The control valve according to the invention can manage with comparatively few pressure-medium passage orifices. Thus, a preferred embodiment of the control valve is distinguished in that, a pressure-medium connection between the pressure-medium source and the pressure-medium power cylinder arrangement is made in at least one position range of the two valve elements relative to one another and relative to the valve housing via exactly two pressure-medium passage orifices in the valve housing, exactly one pressure-medium passage orifice in the first valve element and exactly one pressure-medium passage orifice in the second valve element, and a pressure-medium connection between the pressure-medium power cylinder arrangement and the pressure equalizing orifice is made in at least one other position range of the two valve elements relative to one another and relative to the valve housing via exactly two pressure-medium passage orifices in the valve housing, exactly one pressure-medium passage orifice in the first valve element and exactly one pressure-medium passage orifice in the second valve element, and, in principle, the pressure equalizing orifice may coincide with one of the pressure-medium passage orifices in the valve housing.

It is proposed that the control valve have prestressing means which prestress at least one of the two valve elements in one direction, preferably in a direction of a position corresponding to a basic state of the actuating device without clutch actuation.

If the prestressing means act on the second valve element representing the actual value, then, where appropriate, the prestress will be kept low, depending on the coupling to the disengagement bearing arrangement, so as not to exert any appreciable transverse forces on the disengagement bearing arrangement. Prestressing means of this type are preferably provided for the translational (displaceable) valve element, particularly when the latter is designed integrally or in one piece with a hydraulic or pneumatic piston.

The second valve element may have at least one portion accessible from outside the valve housing or a coupling element connected to this valve element and led out of the valve housing may be provided, the accessible portion or the coupling element serving for Notionally coupling the second valve element to the disengagement bearing arrangement or the disengagement bearing arrangement side of the pressure-medium power cylinder arrangement. Correspondingly, the first valve element may have at least one portion accessible from outside the valve housing or a coupling element connected to this valve element and led out of the valve housing may be provided, the accessible portion or the coupling element serving for moving the first valve element according to the command variable. Simple mechanical coupling of the respective valve element to the disengagement bearing arrangement or to a clutch pedal arrangement or the like is thereby possible.

The first and the second valve element may be designed as cylindrical bodies or cylindrical hollow bodies, in particular circular-cylindrical bodies or circular-cylindrical hollow bodies, capable of being introduced one into the other. The valve housing may comprise an inner housing part and an outer housing part having the recess which receives the valve elements, the inner housing part preferably having a cylindrical portion, in particular a circular-cylindrical portion, which can be introduced into the valve elements.

The valve element displaceable along the valve axis may have rotation securing means, for example in the form of a stud portion, where appropriate a polygonal stud portion, which is preferably coaxial to the valve axis and which can be introduced into an associated cross-sectionally adapted orifice of a housing portion, in particular of the inner housing part. The rotation securing means may also comprise groove and tongue means on the valve element and on an adjacent housing portion.

In order to limit the range of movement of the two valve elements relative to one another and/or to hold the first valve element in the initial position when the actuating device assumes the basic state, one of the two valve elements may have a recess, in particular a long hole which runs in the axial and circumferential directions, where appropriate obliquely to an axially parallel generating line of the valve element, and into which the fitting portion of the other valve element fits, said fitting portion serving preferably as a coupling element. Preferably, the profile of the recess is adapted to the profile of the long hole serving as a pressure-medium passage orifice, in order, on the one hand, to provide a defined response of the actuating device, irrespective of any clutch wear, and/or at least to keep small an idle travel induced, in particular, by clutch wear and, on the other hand, to provide a movement range of the valve elements relative to one another which is necessary for implementing the control states.

In order to achieve high operating reliability for the control valve, surface portions, bearing one on the other, of the valve housing, of the first valve element and of the second valve element may be designed as sealing and/or sliding surfaces, and/or sealing elements may have a sealing effect between these. This applies to all the proposed variants of the control valve according to the invention.

In general, the disengagement direction of the pressure-medium power cylinder arrangement and the disengagement direction of the friction clutch may have any desired orientation relative to one another. This applies not only when the pressure-medium power cylinder arrangement is arranged outside the casing bell and is mounted, for example, on the gear casing. Particularly in the case where the pressure-medium power cylinder arrangement is arranged inside the casing bell, however, it is often expedient if the disengagement direction of the pressure-medium power cylinder arrangement and the disengagement direction of the friction clutch are essentially parallel to one another, the clutch axis and the power cylinder arrangement axis preferably essentially coinciding.

The valve axis and the power cylinder arrangement axis may, in principle, be oriented relative to one another in any desired way and do not need to have any point in common. It is preferred, however, for the valve axis and the power cylinder arrangement axis to be essentially parallel to one another or, in a projection onto a plane essentially parallel to the two axes, to be essentially orthogonal to one another.

The above-described measures and preferred designs of the control valve or of the valve arrangement according to all the variants described each contribute in themselves and also jointly to ensuring that the control valve is of compact design, has high operating reliability and can be produced cost-effectively. The control valve may be arranged completely inside the casing bell or at least partially inside the casing bell and, with the casing bell connected to the internal combustion engine and to the gear, is preferably accessible, in particular removable, from outside. The actuating device can then easily be maintained and, where appropriate, repaired, without the casing bell, generally formed by a portion of a gear casing, having to be released from the internal combustion engine. The control valve may be designed integrally with the pressure-medium power cylinder arrangement, but it is preferred that the control valve be mounted, in particular releaseably, as a separate structural unit on the pressure-medium power cylinder arrangement.

With a view to particularly easy maintenance, it is proposed, as particularly preferred, that a control valve structural unit comprising the control valve be offset, relative to a power cylinder structural unit comprising the pressure-medium power cylinder arrangement, in a direction which is radial with respect to the power cylinder arrangement axis and be mounted releaseably on a radially outer portion of the power cylinder structural unit. In this respect, it is particularly advantageous if the control valve structural unit can be removed from the power cylinder structural unit essentially in the radial direction after the release of any fastening and/or coupling means which take effect between the two structural units and which are accessible preferably from at least one radial direction corresponding essentially to the radial direction. The resulting easy maintenance is applicable in the case of control valves arranged both inside and outside the casing bell.

The pressure medium may be a pneumatic or hydraulic pressure medium. It is particularly preferred that the pressure medium be a pneumatic pressure medium, the pressure-medium source being preferably an overpressure source supplying a higher pressure than ambient pressure.

The invention also relates to a control valve, in particular for an actuating device as claimed in one of the preceding claims, which, according to the invention, has at least some of the above-described control valve features of the actuating device according to the invention.

BRIEF DESCRIPTION OF THE DRAWINGS

The invention is explained in more detail below with reference to exemplary embodiments shown in the figures, in which:

FIG. 14 shows a third cross section through the control valve of FIGS. 8 and 9 along the line XIV—XIV in FIG. 11.

FIG. 17 to FIG. 24 show, in each case, a diagrammatic longitudinal section and a diagrammatic cross section through a respective variant of a control valve having a rotatable and a displaceable valve element, in order to explain various possibilities of assignment between the valve elements, on the one hand, and the command variable and actual value, on the other hand.

DETAILED DESCRIPTION OF THE PREFERRED EMBODIMENTS

Figure 1:
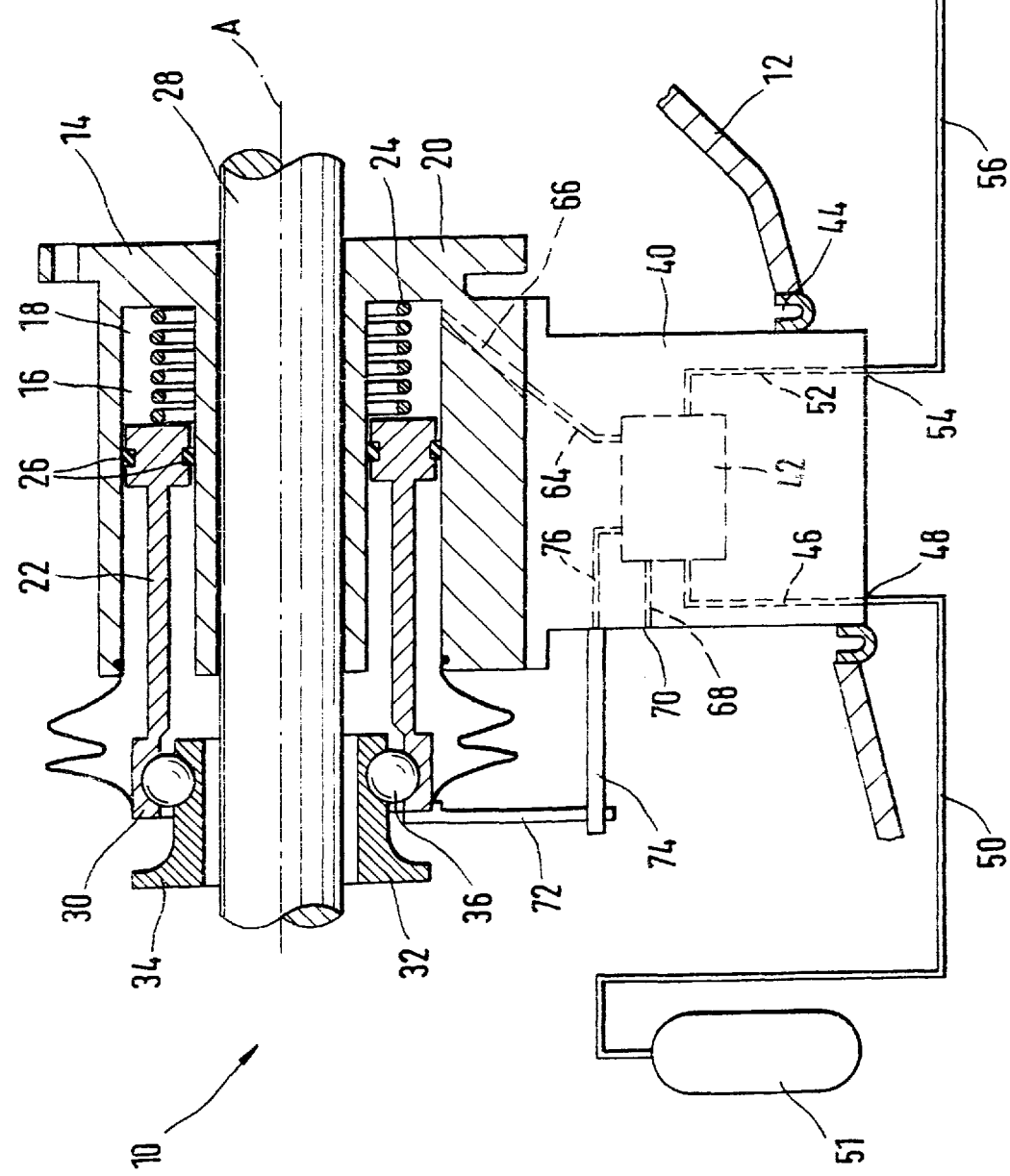
FIG. 1 shows a diagrammatic, partially sectional view of an actuating device according to the invention, with a pressure-medium power cylinder arrangement in the form of an annular pressure-medium cylinder, in particular annular pneumatic cylinder.

FIG. 1 shows diagrammatically an actuating device 10 according to the invention for a friction clutch, here a depressed clutch, arranged in the drivetrain of an automobile between an internal combustion engine and a gear in a casing bell 12. The actuating device 10 comprises a pressure-medium power cylinder arrangement 14, here a pneumatic power cylinder arrangement, which is designed as a structural unit and which is also designated below as an actuating cylinder structural unit. The actuating cylinder structural unit 14 comprises an annular pressure-medium cylinder, here an annular pneumatic cylinder 16, which is formed by an annular-cylindrical recess 18 in a stationary body part 20 and by a pneumatic annular piston element 22. The pneumatic annular piston element 22 is prestressed by spring means 24 in the direction of the clutch which is not shown (to the left in FIG. 1) and carries sealing rings 26 for sealing off the annular-cylindrical space of the annular pneumatic cylinder 16.

The annular pneumatic cylinder 16 and the pneumatic annular piston element 22 are arranged coaxially to a clutch axis A. The body part 20 has an axial bore, through which the gear input shaft 28 extends coaxially to the clutch axis A.

An annular portion 30 of the pneumatic annular piston element 22 at the clutch-side end of the annular piston element forms a disengagement ring 30 of a disengagement bearing arrangement 32 which, furthermore, comprises a disengagement ring 34, rotatable relative to the disengagement ring 30 and corotating with the clutch, and a ball bearing 36 allowing relative rotation between the two disengagement rings 30 and 34. When the actuating device is actuated, the disengagement bearing arrangement acts in a known way, in particular via diaphragm spring tongues, on the clutch, in order to disengage the latter so as to interrupt the force flux between the gear and the internal combustion engine.

The actuating cylinder structural unit 14 carries a control valve structural unit 40 which is fastened releaseably to the actuating cylinder structural unit and which comprises a control valve 42 shown merely diagrammatically in FIG. 1. The control valve structural unit 40 is arranged in such a way that it projects through an associated orifice 44 in the casing bell 12 beyond the outer face of the bell and can be removed while the casing bell is still connected to the internal combustion engine and to the gear.

The control valve 42 is connected to a pneumatic source 51 via a pneumatic line 46 within the control valve structural unit 40, via a pneumatic connection 48 on that portion of the control valve structural unit which projects beyond the outer face of the casing bell 12 and via a further pneumatic line 50. Furthermore, the control valve 42 is connected to a command signal encoder unit 60 via a line 52 within the control valve structural unit 40, via a connection 54 on that portion of the control valve structural unit 40 which projects beyond the outer face of the casing bell 12 and via a further line 56.

The command signal encoder unit 60 is, in the present case, a clutch pedal arrangement 60 having a clutch pedal 62 and designed to transmit a command signal in the form of a hydraulic signal to the control valve 42 via the line 56, the connection S4 and the line 52. The lines 52 and 56 are, correspondingly, hydraulic lines which are connected via the connection 54 designed as a hydraulic connection.

Furthermore, the control valve 42 is connected to the annular-cylindrical space of the annular pneumatic cylinder 16 via a pneumatic line 64 within the control valve structural unit 40 and via a pneumatic line 66 within the actuating cylinder structural unit 14. Furthermore, the control valve 42 is connected to a pressure equalizing orifice 70 in the clutch-side surface of the control valve structural unit via a pneumatic line 68 within the control valve structural unit 40.

The instantaneous axial position of the disengagement bearing arrangement 32 is supplied to the control valve 42 via mechanical coupling elements 72 and 74 in the form of a mechanical actual value signal representing a travel, as illustrated diagrammatically by the dashed connection 76 within the control valve structural unit 40. For this purpose, the rodlike coupling element 74 projecting from the control valve structural unit 40 is motionally coupled to one valve element of a valve arrangement comprising two valve elements. Of the two valve elements, a first valve element is assigned to the command signal encoder unit 60, and a second (the already mentioned) valve element is assigned to the disengagement bearing arrangement and is motionally coupled to the latter via the coupling elements 72 and 74 in terms of the axial movement of said disengagement bearing arrangement. The two valve elements, mounted movably relative to one another and relative to the control valve structural unit 40, serve for implementing various control states of the control valve 42. For preferred embodiments of the control valve 42, reference is made to the following exemplary embodiments.

The control valve 42 changes over between three control states as a function of the command signal, which is emitted by the command signal encoder unit 60 and which presets a desired axial position of the disengagement bearing arrangement 32, and of the actual value signal, which indicates the instantaneous axial position of the disengagement bearing arrangement 32. In a first control state, a pneumatic connection between the annular pneumatic cylinder 16 and the pneumatic source 51 is made via the control valve 42, so that pneumatic medium, here compressed air, is supplied to the annular pneumatic cylinder by the pneumatic source 52 and disengages the pneumatic annular piston element 22 correspondingly from the recess in the direction of the clutch. In a second control state of the control valve 42, a pneumatic connection between the annular pneumatic cylinder 16 and the pressure equalizing orifice 70 is made via the control valve 42, so that the disengaged pneumatic annular piston element 22 is engaged into the recess 18 again by means of the pressure force of the main clutch spring, for example a diaphragm spring or the like, the compressed air located in the annular-cylindrical space of the annular pneumatic cylinder 16 flowing out of the pressure equalizing orifice 70. In a third control state, the annular-cylindrical space of the annular pneumatic cylinder 16 is closed off so as to be essentially pneumatically tight, so that the pneumatic annular piston element 22 maintains its instantaneous axial position.

The control valve 42 forms, with its valve elements, the pneumatic power cylinder arrangement 14, the coupling element 72 constituting an encoder element of the actual value signal and the coupling element 74, a mechanical position regulating arrangement which, as a result of an appropriate changeover between the three control states, sets the axial position of the disengagement bearing arrangement 32 to the desired position indicated by the command signal from the command signal encoder unit 60. For this purpose, the instantaneous position of the disengagement bearing arrangement 42 is represented as an actual value by the position of the second valve element and the desired position of the disengagement bearing arrangement is represented as a command variable by the position of the first valve element. The actual value and command variable are assigned a difference quantity which is represented by the position of the first and of the second valve element relative to one another and which assumes the value zero when the actual axial position of the disengagement bearing arrangement 32 corresponds to the desired position.

Further exemplary embodiments of the actuating device according to the invention or of individual components of actuating devices according to the invention are explained below. In this case, as far as is expedient, the description of the respective exemplary embodiment uses the same reference symbols for identically acting or similar components as in the exemplary embodiment or exemplary embodiments already described previously. At the same time, in each case, only the differences from the embodiment or embodiments already described are discussed and reference is otherwise made expressly to the preceding description of the other embodiment or embodiments. In order to distinguish the embodiments, the reference symbols are identified by small letters in alphabetic order (without a and c).

Figure 2:
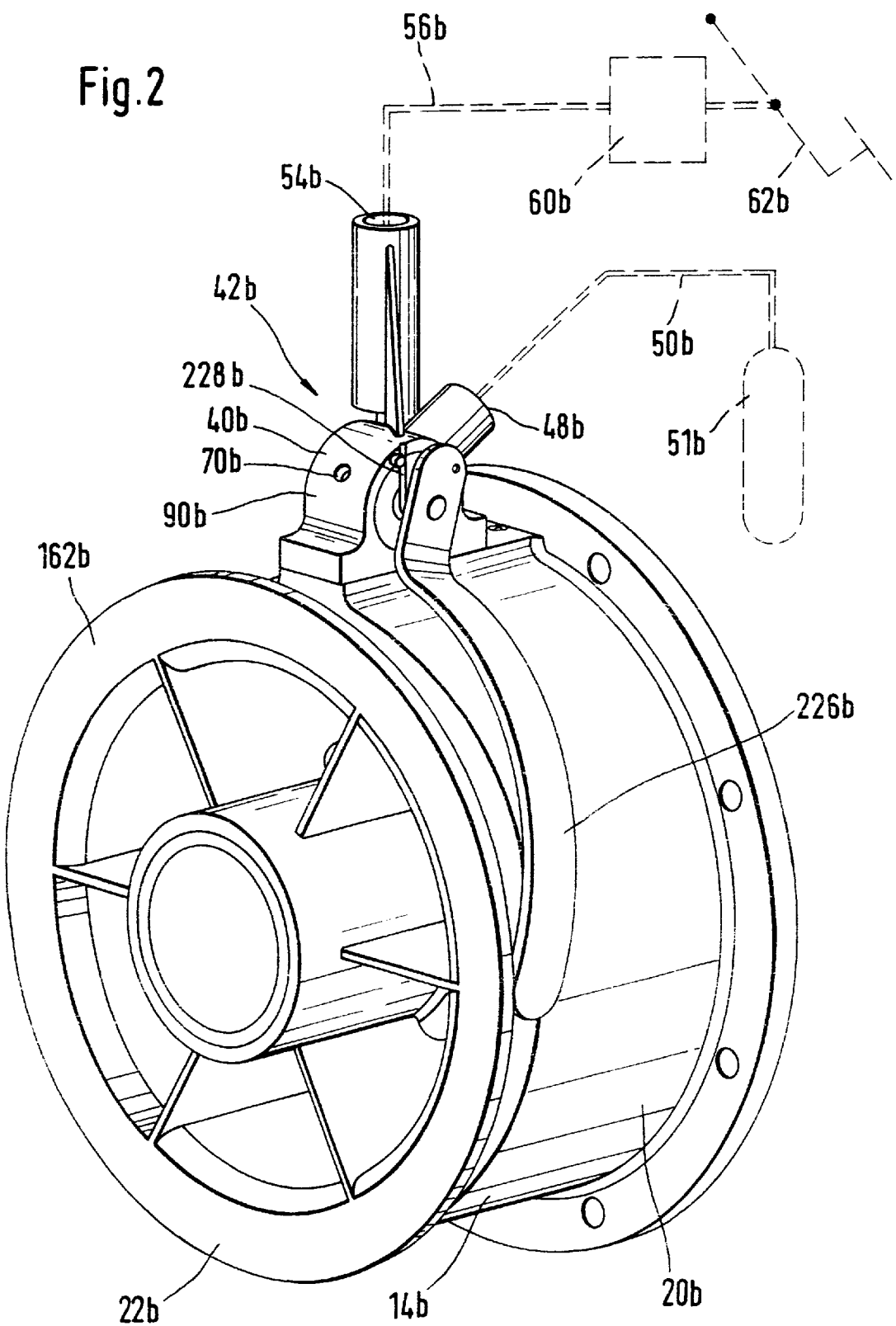
FIG. 2 shows a perspective view of a pressure-medium power cylinder arrangement, with a flanged-on control valve, of a further actuating device according to the invention.
Figure 3:
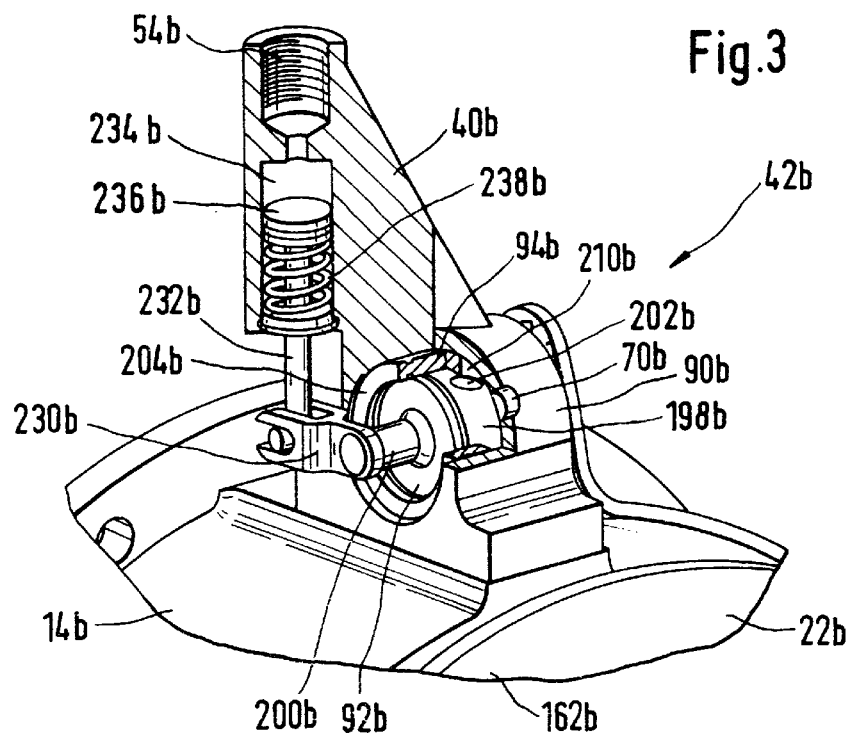
FIG. 3 shows the control valve and a portion of the pressure-medium power cylinder arrangement of FIG. 2 in a partially sectional perspective view in a different viewing direction.

FIG. 2 shows an actuating cylinder structural unit 14b of an actuating device according to the invention which likewise comprises an annular pneumatic cylinder 16b with a pneumatic annular pistone element 22b. The cylindrical space of the annular pneumatic cylinder 16b is sealed off by means of at least one sealing ring 27b taking effect between the pneumatic annular piston element 22b and the body part 20b of the actuating cylinder structural unit 14b. A control valve structural unit 40b is releaseably flanged-on to the actuating cylinder structural unit 14b. The control valve structural unit 40b comprises a control valve 42b with a valve housing 90b, in which two valve elements, namely a first valve element 92b and a second valve element 94b, are mounted movably relative to one another and relative to the valve housing 90b. The control valve 42b has a pneumatic connection 48b, to which the pneumatic source 51b is connected via the pneumatic line 50b. Furthermore, the control valve has a hydraulic connection 54b, to which the clutch pedal arrangement 60b is connected via the hydraulic line 56b.

In the exemplary embodiment of FIGS. 2 to 6, the first valve element 92b and the second valve element 94b are rotatable about a valve axis B' in order to represent the axial actual position of the disengagement bearing arrangement or of the pneumatic annular piston element 22b by means of the rotary position of the second valve element 94b and in order to represent the desired position of the disengagement bearing arrangement or of the pneumatic annular piston element 22b by means of the rotary position of the first valve element 92b.

The valve housing 90b has a circular-cylindrical passage bore 180b which extends coaxially to the valve axis B' transversely through the valve housing 90b, is open on both sides and receives the two valve elements, that is to say the first valve element 92b and the second valve element 94b. The control states of the control valve are implemented solely by the first valve element 92b and the second valve element 94b.

Three radial bores 182b, 184b and 186b lying in a common plane orthogonal to the valve axis B' open into the passage bore 180b, the same circumferential angle distance, in each case with respect to the valve axis B', lying between the radial bore 182b and the radial bore 184b, between the radial bore 184b and the radial bore 186b and between the radial bore 186b and the radial bore 182b, and the three bores in each case covering an identical circumferential angle range. In the view according to FIG. 5, the three radial bores succeed one another along the circumference of the passage bore 180b clockwise in the order 182b, 184b and 186b.

The radial bore 182b makes a connection between the inner space of the passage bore 180b and the vicinity and serves as the pressure equalizing orifice 70b of the control valve. The radial bore 184b is part of the pneumatic connection 48b and thus makes a pneumatic connection between the inner space of the passage bore 180b and the pneumatic source 51b via the pneumatic line 50b. The radial bore 186b has adjoining it, in the body part 20b of the actuating cylinder structural unit 14b, bores 188b, via which a connection is made between the inner space of the passage bore 180b and the cylindrical space of the annular pneumatic cylinder 166b (cf. FIG. 5). (The first valve element 92b has not yet been taken into account in these considerations.) The intersecting bores 190b and 192b are closed relative to the outside of the body part 20b by means of pressed-in closing balls 194b.

Figure 4:
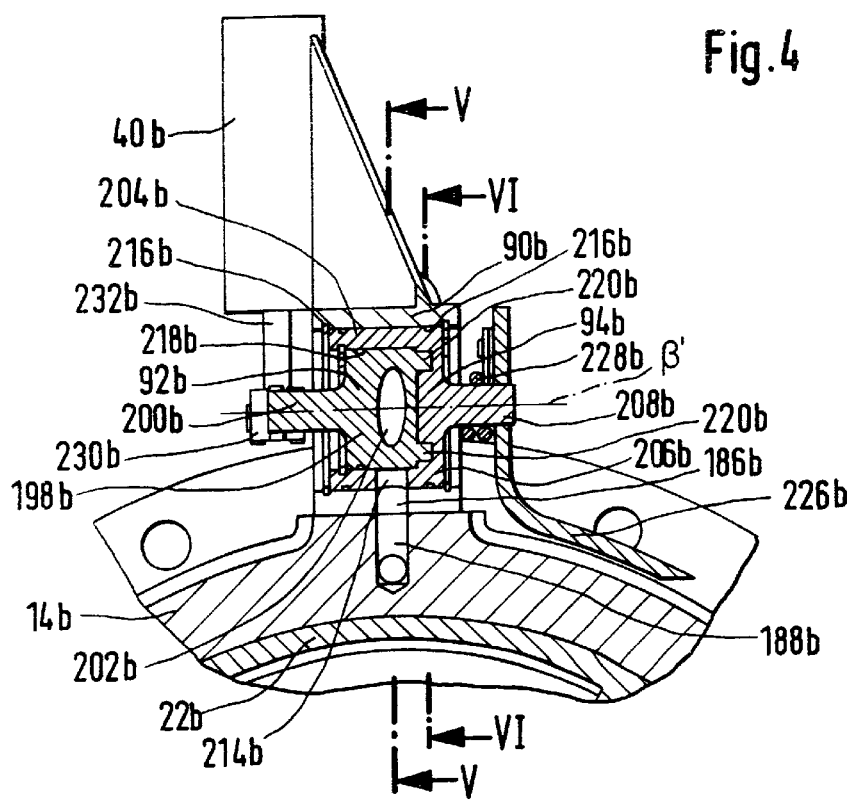
FIG. 4 shows a section through the control valve and a portion of the annular pressure-medium cylinder, in particular annular pneumatic cylinder, of the pressure-medium power cylinder arrangement of FIG. 2 along the line IV—IV in FIG. 5.

The first valve element 92b has a circular-cylindrical main portion 198b which is received in the passage bore 180b and is coaxial to the valve axis B' and which has adjoining it a circular-cylindrical tenon portion 200b of the first valve element 92b, said tenon portion 200b likewise being coaxial to the valve axis B' and projecting out of the passage bore 180b on one side (the left side in FIG. 4). The main portion 198b has a passage bore 202b which is directed radially to the valve axis B' and which lies in the same plane, perpendicular to the valve axis B', as the radial bore 182b, 184b and 186b.

The main portion 198b of the first valve element 92b in the passage bore 180b is surrounded by a circular-cylindrical annular portion 204b of the second valve element 94b, said annular portion filling the remaining annular space between the main portion 198b and the inner circumferential surface of the passage bore 180b and being coaxial to the valve axis B'. The annular portion 204b has adjoining it, in the direction of that end of the passage bore 180b which is opposite the tenon portion 200b, a circular wall portion of the second valve element 94b, said wall portion still being arranged in the passage bore 180b an corresponding essentially to the latter in radius, said wall portion having adjoining it, in turn, a circular-cylindrical tenon portion 208b which projects from the passage bore 180b and which is coaxial to the valve axis B'. The tenon portion 200b of the first valve element therefore projects on one side of the passage bore 180b and the tenon portion 208b of the second valve element therefore projects on the other side of the passage bore 180b.

The annular portion 204b of the second valve element has three passage recesses 210b, 212b and 214b which resemble long holes and may be designated as slots or perforations and which in each case extend in the circumferential direction with respect to the valve axis B' and lie in the same plane, orthogonal to the valve axis B', as the radial bores 182b, 184b and 186b and the passage bore 202b. The three passage recesses 210b, 212b and 214b, designated below in brief as perforations, in each case cover an identical circumferential angle, and the circumferential angle distances between the perforation 210b and the perforation 212b, between the perforation 212b and the perforation 214b and between the perforation 214b and the perforation 210b are identical. The circumferential angle covered by the perforations is about 95°, whereas the circumferential angle distance between the perforations is about 25°. The radial bores 182b, 184b, 186b, the passage bore 202b and the perforations 210b, 212b and 214b extend in the axial direction in each case over the same axial range of the control valve, as may be seen clearly in FIG. 4.

Sealing rings 216b are provided in the outer circumferential surface of the annular portion 204b of the second valve element 94b on both sides of the perforations 210b, 212b, 214b and a sealing ring 218b, offset relative to the passage bore 202b in the direction of the tenon portion 200b, is provided in the main portion 198b of the first valve element 92b. These sealing rings 216b and 218b serve for sealing off, so as to be pneumatically tight relative to the two open ends of the passage bore 180b, that axial region of the passage bore 180b between the sealing rings 216b which comprises the radial bores 182b, 184b and 186b, the passage bore 202b and the perforations 210b, 212b and 214b. Furthermore, spring rings, which can be seen in FIG. 4, but are not designated, are provided, which secure the second valve element 94b in the passage bore 180b and the first valve element 92b, by means of its main portion 198b, in the interior of the annular portion 204b of the second valve element 94b.

Figure 6:
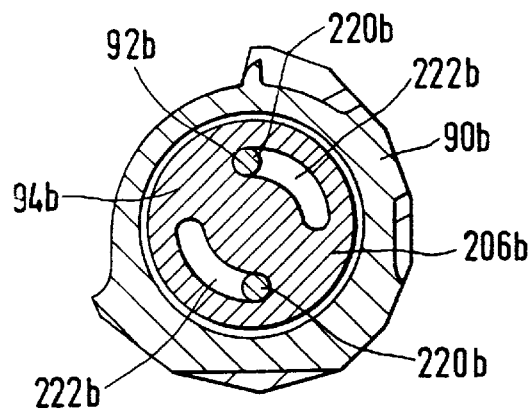
FIG. 6 shows a section through the control valve of FIG. 2 along the line VI—VI in FIG. 4.

The two valve elements 92b and 94b are rotatable relative to one another to only a restricted extent, since two studs 220b, offset radially relative to the valve axis B', are provided on that axial end face of the main portion 198b of the first valve element 92b which is opposite the tenon portion 200b, said studs fitting into a respective recess 222b in the wall portion 206b of the second valve element 94b, said recess extending along an arc of a circle (cf. FIG. 4 and FIG. 6). By virtue of the dimensioning of the recesses 222b, it becomes possible for the two valve elements to have relative rotatability over an angle range amounting to about 75° to 80°.

The two valve elements 92b and 94b are designed with the perforations 210b, 212b and 214b, with the passage bore 202b, with the studs 220b and with the recesses 222b being related to one another such that, in every possible relative rotary position of the two valve elements, the passage bore 202b is connected on one side to the perforation 214b and is connected on its other side either to the perforation 210b or to the perforation 212b or is closed so as to be pneumatically tight by means of a portion 224b forming a closing and control portion and located between the two perforations 210b and 212b. In this case, the perforation 210b is constantly connected to the pressure equalizing orifice 70b, the perforation 212b is constantly connected, via the bore 184b, to the pressure-medium source 51b, and the perforation 214b is constantly connected, via the bore 186b, to the cylindrical space of the annular pneumatic cylinder 16b.

The second valve element 94b is motionally coupled to the pneumatic annular piston element 22b in such a way that exactly one rotary position of the second valve element 94b is assigned to each axial position (relating to the clutch axis) of the pneumatic annular piston element 22b and, consequently, of the disengagement bearing arrangement. For this purpose, a caliper 226b is mounted fixedly in terms of rotation on the tenon portion 208b of the second valve element 94b and is prestressed against the flangelike end portion 162b of the pneumatic annular piston element 22b by a helical or leg spring 228b surrounding the tenon portion 208b and acting (cf. FIG. 2 and FIG. 4) on the caliper 226b and on the valve housing 90b. In this case, the caliper 226b acts on that side of the end portion 162b which is remote from the clutch.

Mounted fixedly in terms of rotation on the tenon portion 200b is a lever 230b which, with a piston rod 232b of a cylinder/piston arrangement 234b, forms a two-membered toggle lever. The cylinder/piston arrangement 234b is a hydraulic slave cylinder which is connected to the clutch pedal arrangement 60b via the connection 54b and the hydraulic line 56b. A piston 236b on the piston rod 232b is prestressed by a helical compression spring 238b with the effect of reducing the cylindrical space of the hydraulic slave cylinder 234b.

The hydraulic slave cylinder 234b is designed as a structural unit with the valve housing 90b.

The toggle lever arrangement, comprising the lever 230b and the piston rod 232b, serves for converting a displacement movement of the piston 236b into a rotational movement of the first valve element 92b. Exactly one rotary position of the first valve element 92b is assigned to each displacement position of the piston 236b.

Figure 5:
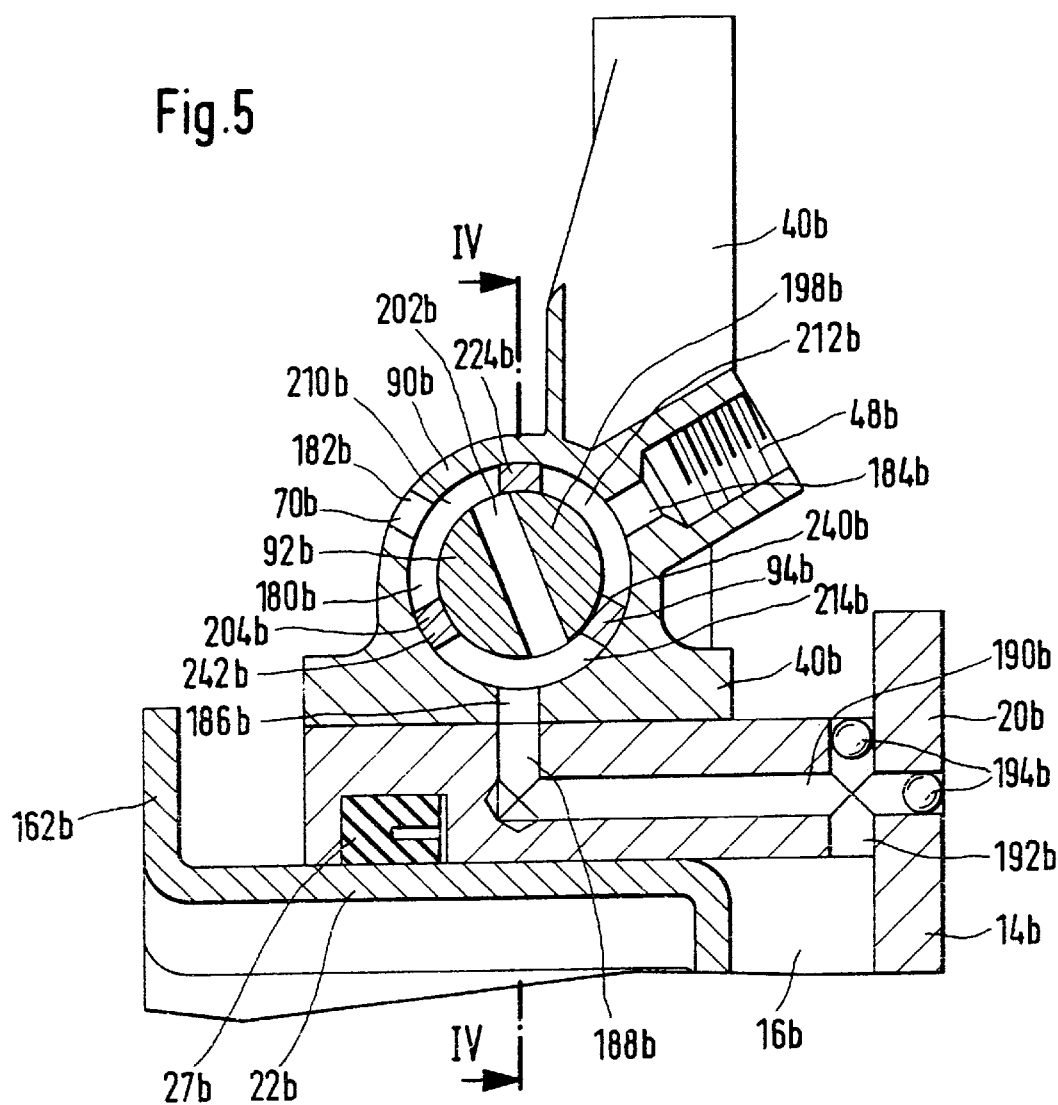
FIG. 5 shows a section through the control valve and part of the pressure-medium power cylinder arrangement of FIG. 2 along the line V—V in FIG. 4.

When the control valve is in a basic position, in which the clutch pedal 62b of the clutch pedal arrangement 60b is not depressed and the pneumatic annular piston element 22b is not disengaged, that is to say assumes its axial position the most remote from the clutch, the opening orifice of the passage bore 202b in the main portion 198b of the first valve element 92b, said opening orifice being opposite the perforation 214b, is arranged approximately opposite the pressure equalizing orifice 70b and the closing and control portion 224b is offset somewhat relative to the pressure equalizing orifice 70b, clockwise with respect to FIG. 5, in the direction of the bore 184b. The other opening orifice of the passage bore 202b is located opposite the perforation 214b, that is to say is not closed by that portion 240b of the annular portion 204b of the second valve element 94b which separates the perforation 214b from the perforation 212b. Thus, in the basis state described, there is a constant venting connection between the cylindrical space of the annular pneumatic cylinder 16b and the pressure equalizing orifice 70b, specifically via the bores 192b, 190b, 186b, the perforation 214b, the passage bore 202b and the perforation 210b. In this case, the compressed air of the pneumatic source 51b is retained by the closing and control portion 224b and the portion 240b of the annular portion 204b of the second valve element 94b.

When the clutch pedal 62b is actuated by the driver, then, the first valve element 92b (which may also designated as a pedal travel unit), with the opening orifice of the passage bore 202b hitherto being located approximately opposite the venting orifice 70b, is rotated in the direction of the bore 184b forming the compressed-air inlet orifice. In this case, by the overrun of the closing and control portion 224b, forming a control edge, between the perforation 210b and the perforation 212b, first the venting is closed, in that the closing and control portion 224b closes the passage bore 202b, and thereafter the ventilating connection between the cylindrical space of the annular pneumatic cylinder 16b and the pneumatic source 51b is made, specifically via the bore 184b, the perforation 212b, the passage bore 202b and the bores 186b, 188b, 190b and 192b. When compressed air flows into the cylindrical space, then, the pneumatic annular piston element 22b moves in the direction of the clutch counter to the force of the diaphragm spring. At the same time, the second valve element (which may be designated as a disengagement travel unit) follows the rotary angle predetermined by the first valve element. While compressed air is being supplied to the cylindrical space of the annular pneumatic cylinder 16b, the compressed air supplied is prevented from flowing out of the pressure equalizing orifice 70b by the closing and control portion 224b and by a portion of the annular portion 204b of the second valve element 94b, said portion separating the perforation 214b from the perforation 210b.

When the clutch pedal is held in the actuating position assumed, the closing and control portion 224b closes the passage bore 202b in the main portion 198b of the first valve element 92b again when the rotary angle predetermined by the first valve element is reached, so that the supply of compressed air is interrupted, but there is also no venting connection made between the cylindrical space of the annular pneumatic cylinder 16b and the pressure equalizing orifice 70b. An equilibrium of forces then prevails between the force exerted on the pneumatic annular piston element 22b by the diaphragm spring and the force exerted on the pneumatic annular piston element 22b by the compressed air in the cylindrical space of the annular pneumatic cylinder 16b.

If the clutch pedal 62b is released again, the first valve element 92b is rotated in the opposite direction due to the spring force exerted on the piston 236b by the spring 238b, so that the venting connection between the pressure equalizing orifice 70b and the cylindrical space of the annular pneumatic cylinder 16b is made once again and the pneumatic annular piston element 22b is pushed away from the clutch in the direction of the gear by the force of the diaphragm spring, with the second valve element 94b being rotated correspondingly.

As the foregoing statements make clear, in the exemplary embodiments described above with reference to FIGS. 2 to 6, the desired position of the pneumatic annular piston element 22b and, consequently, of the disengagement bearing arrangement and the instantaneous actual position of the pneumatic annular piston element 22b and, consequently, the disengagement bearing arrangement are represented by rotary positions of the first valve element 92b and of the second valve element 94b. The first valve element thus represents, with its rotary position, a command variable and the second valve element thus represents, with its rotary position, an actual value, on the basis of which the control valve changes over between the control states indicated in general terms with reference to FIG. 1. In this case, the command variable and the actual value may be assigned a difference quantity which is represented by the rotary position of the two valve elements relative to one another.

It should also be added, as regards the recesses 222b and studs 220b restricting the relative rotatability of the two valve elements, that the arrangement is such that the second valve element 94b drives the first valve element 92b when the "rotary position of rest" of the second valve element 94b in the fully coupled state, without clutch actuation, changes in course of time as a result of increasing clutch wear. Thus, in the basic state of the actuating device without clutch actuation, the two valve elements always assume (irrespective of the state of wear of the clutch) the same rotary position relative to one another, so that, in the course of increasing clutch wear, only the rotary position of the two valve elements relative to the valve housing changes and an increasing idle travel at the start of pedal actuation is avoided. The two recesses 222b thus in each case serve, at one end, as a limit stop for the second valve element 94b which during coupling, via the studs 220b, drives the first valve element 92b into the basic position or position of rest determined by the state of the clutch.

Figure 7:
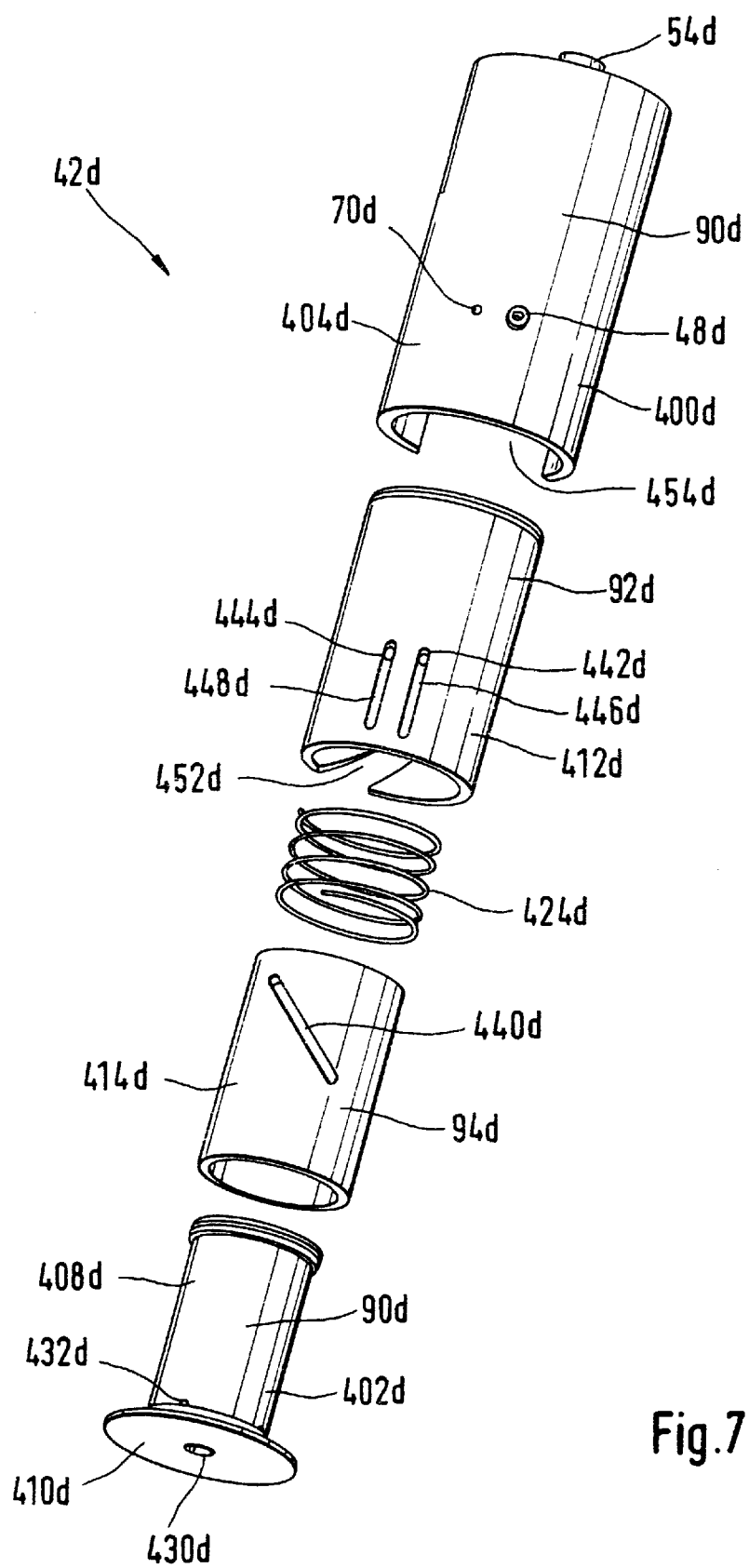
FIG. 7 shows an exploded view of the components of a further exemplary embodiment of a control valve according to the invention for an actuating device according to the invention.
Figure 9:
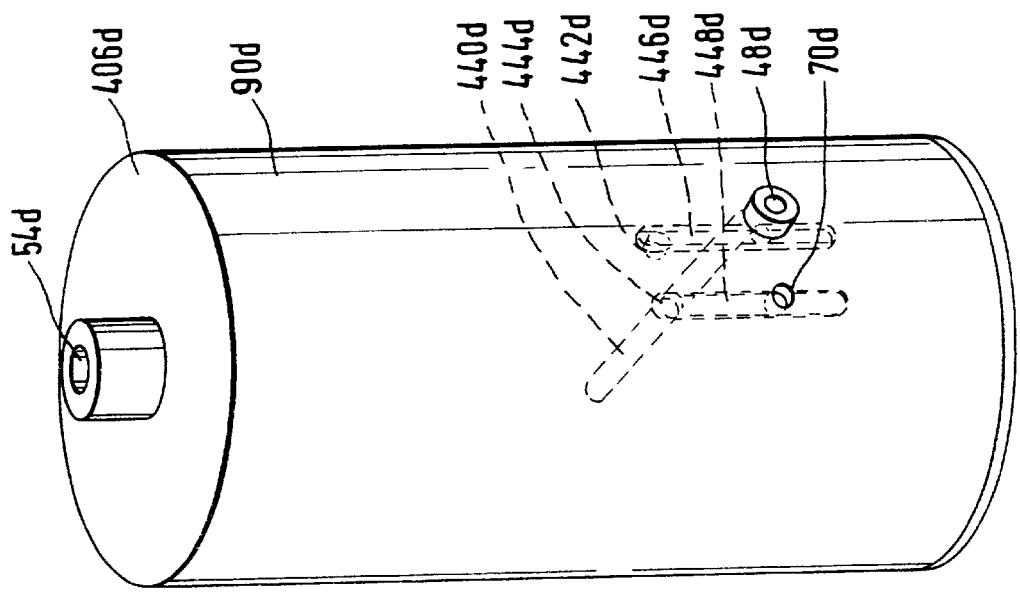
FIG. 9 shows a second perspective side view of the assembled control valve of FIG. 8 in a different viewing direction.
Figure 8:
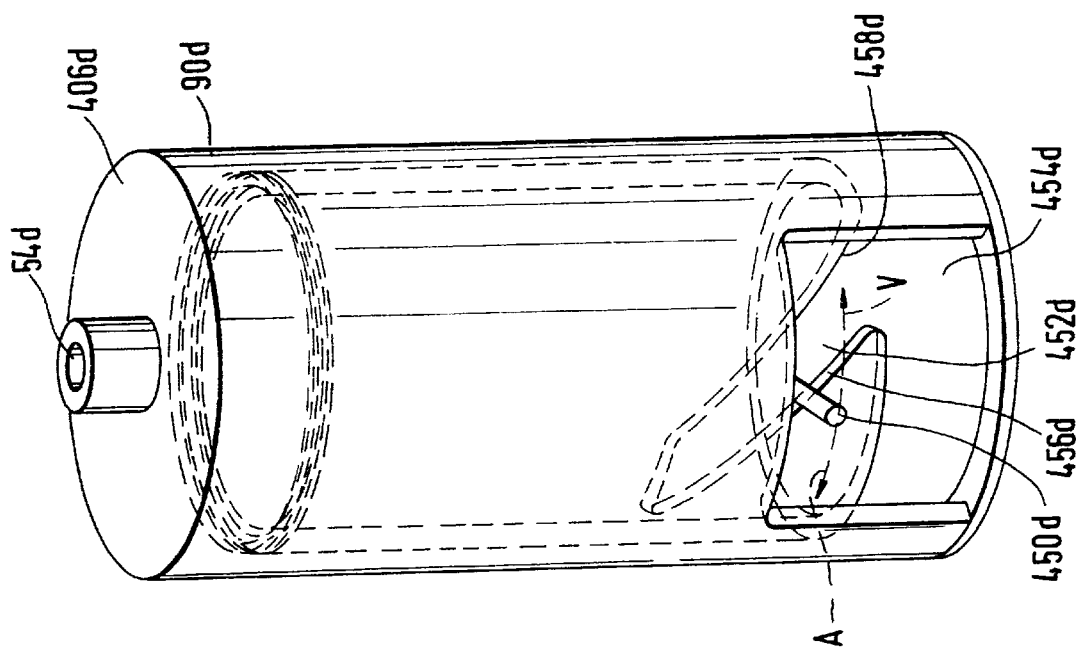
FIG. 8 shows a first perspective side view of the assembled control valve of FIG. 7.
Figure 11:
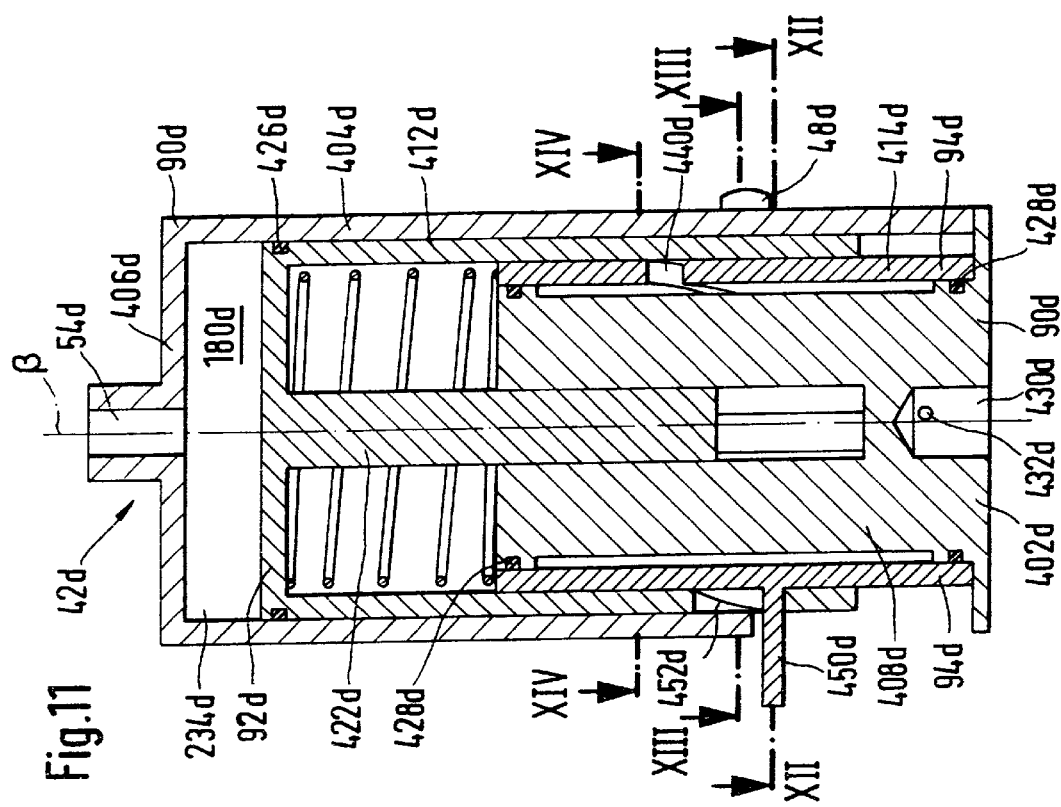
FIG. 11 shows a second longitudinal section through the control valve of FIGS. 8 and 9 along the line XI—XI in FIG. 13.
Figure 10:
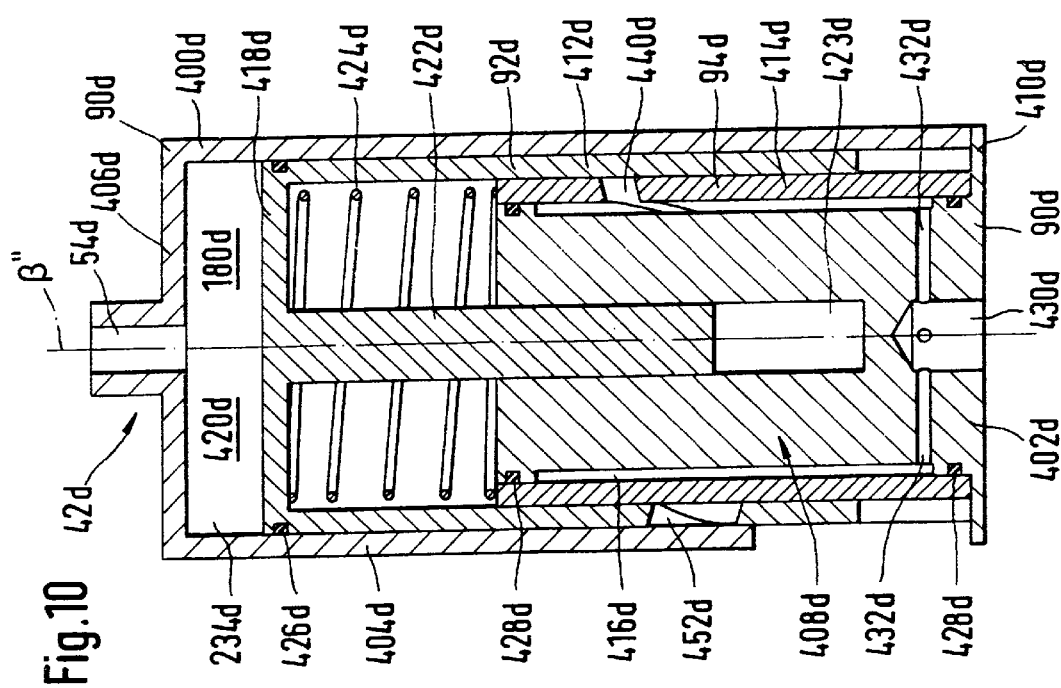
FIG. 10 shows a first longitudinal section through the control valve of FIGS. 8 and 9 along the line X—X in FIG. 13.
Figure 12:
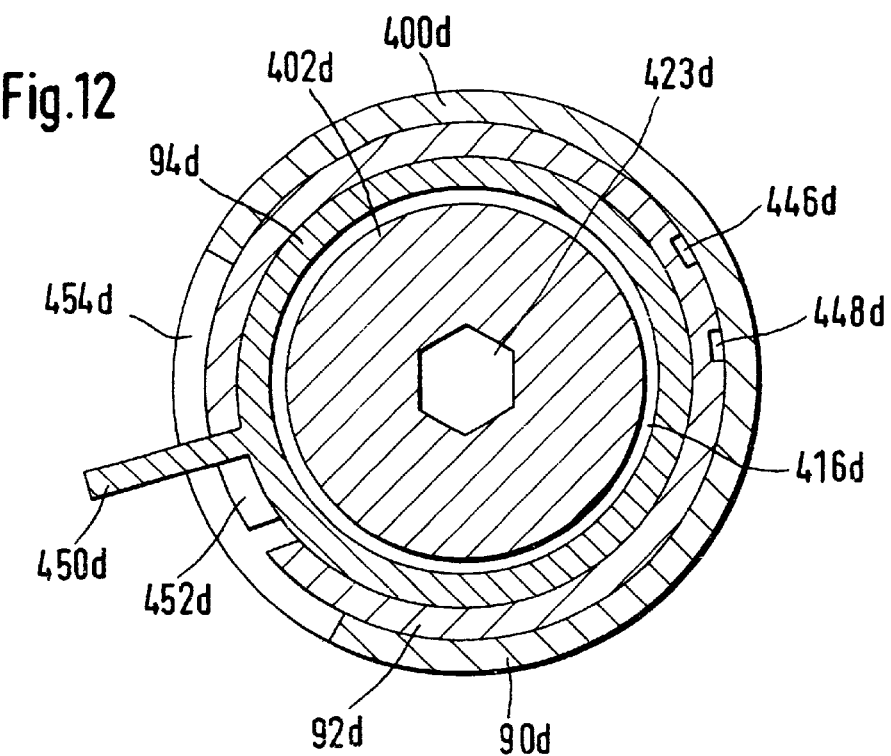
FIG. 12 shows a first cross section through the control valve of FIGS. 8 and 9 along the line XII—XII in FIG. 11.
Figure 13:
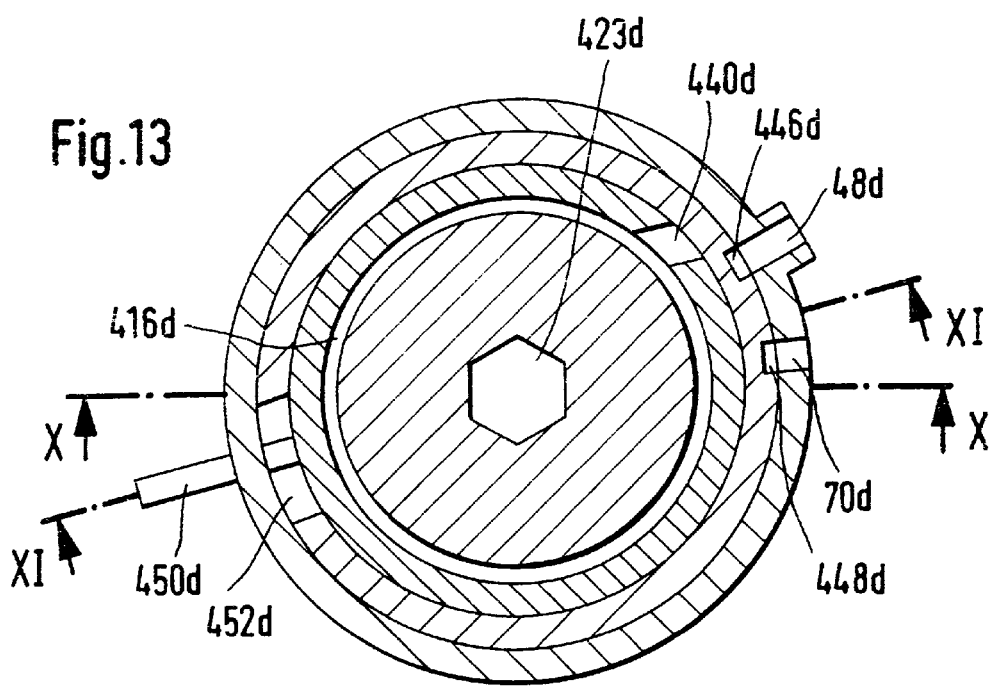
FIG. 13 shows a second cross section through the control valve of FIGS. 8 and 9 along the line XIII—XIII in FIG. 11.

A further exemplary embodiment of a control valve according to the invention, which could be provided in the actuating device of FIG. 1 within the control valve structural unit, is shown in FIGS. 7 to 16. FIG. 7 shows the control valve 42d in an exploded perspective view which reveals all the essential components of the control valve. The control valve has a two-part valve housing 90d with a first housing part 400d and with a second housing part 402d. The first or else outer housing part 400d is designed as a circular-cylindrical hollow body and has a recess 180d delimited by a cylinder wall 404d and, at one axial end, by an end wall 406d. The recess 180d serves for receiving two valve elements 92d and 94d and a circular-cylindrical inner portion 408d of the second housing part 402d, said inner portion closing the other axial end of the recess 180d by means of an end wall 410d in the assembled state. As may be seen in FIGS. 10 and 11, when the control valve is in the assembled state, an annular-cylindrical interspace is formed between the circular-cylindrical inner portion 408d of the second housing part 402d and the cylinder wall 404d of the first housing part 400d, the two valve elements 92d and 94d being received into said interspace by means of a respective circular-cylindrical wall portion 412d (first valve element 92d) and 414d (second valve element 94d). As shown in FIGS. 10 and 11, said components are inserted one into the other, the cylinder wall 404d radially surrounding the wall portion 412d of the first valve element 92d externally, the wall portion 412d of the first valve element 92d radially surrounding the wall portion 414d of the second valve element 94d externally, and the wall portion 414d radially surrounding the inner portion 408d of the second housing part 402d externally. An annular space 416d, which serves as a pressure-medium passage and the function of which will be discussed further, is formed between the circular-cylindrical wall portion 414d of the annularly designed second valve element 94d and the inner portion 408d.

The first valve element 92d is displaceable along the valve axis B" and is designed as a piston element of a cylinder/piston arrangement 234d integral with the control valve. For this purpose, the first valve element 92d has an end wall portion 418d which adjoins the circular-cylindrical wall portion 412d coaxial to the valve axis B" and which extends orthogonally to the valve axis B" and, together with the end wall 406d of the first housing part 400d and the cylinder wall 404d of the first housing part 400d, delimits a hydraulic slave cylinder 420d which is connected to the hydraulic master cylinder of a clutch pedal arrangement via a hydraulic connection 54d formed in the end wall 406d and via a hydraulic line which is not shown.

The first valve element 92d is secured against rotation relative to the valve housing 90d by means of a polygonal pin portion which adjoins the end wall 418d, is coaxial to the valve axis B" and is radially surrounded externally by the wall portion 412d and which fits into a cross-sectionally adapted orifice 423d in the inner portion 408d of the second housing part 402d connected, for example screwed (not shown in the figures) fixedly in terms of rotation to the first housing part 400d. Clamped between the first valve element 92d and the second valve element 94d is a helical spring 424d which surrounds the polygonal pin portion 422d and which prestresses the first valve element 92d with the effect of reducing the volume of the slave cylinder 420d and holds the second valve element 94d, rotatable about the valve axis B", in a predetermined axial position in bearing contact on the end wall 410d of the second housing part 402d. The second valve element 94d is thus rotatable about the valve axis B" due to the action of the spring 424d, but is secured against displacement along the valve axis B".

In order to seal off the hydraulic slave cylinder 420d, the first valve element 92d carries an O-ring 426d. The inner portion 408d of the second housing part 402d likewise carries a first and a second O-ring 428d which seal off the annular space 416d relative to the rest of the recess 180d.

In order to implement the control states of the control valve which are mentioned with reference to FIG. 1, the latter has two orifices in the cylinder wall 404d of the first housing part 400d, said orifices serving as a pneumatic connection 48d and a pressure equalizing orifice 70d.

The pneumatic connection 48d has a bore through the cylinder wall 404d and an annular flange, surrounding the bore, on the outside of the housing and serves for supplying the control valve with pressure medium, in the present case compressed air, which is supplied by a pneumatic source via a pneumatic line which is not shown. The pressure equalizing orifice 70d is designed as a simple bore in the cylinder wall 404d, is at the same axial height as the pneumatic connection 48d and is offset relative to the pneumatic connection 48d in the circumferential direction at an angle of about 23° with respect to the valve axis B". Furthermore, the control valve 42d has, at its end opposite the hydraulic connection 54d, a pneumatic connection in the form of a blind bore 430d in the second housing part 402d, said blind bore being coaxial to the valve axis B" and serving for connecting the control valve to an associated pressure-medium power cylinder arrangement, here pneumatic cylinder arrangement, of an actuating device comprising the control valve.

In order to implement the control states, firstly a pneumatic connection between the pneumatic source and pneumatic cylinder arrangement via the pneumatic connection 48d and pneumatic connection 430d, secondly a pneumatic connection between the pneumatic cylinder arrangement and pressure equalizing orifice 70d via the pneumatic connection 430d and thirdly an essentially pneumatically tight closing off of the pneumatic cylinder arrangement, the control valve 42d has various pressure-medium passage orifices and pressure-medium passages, of which the pressure-medium passage 416d between the second valve element 94d and the inner portion 408d of the second housing part 402d has already been mentioned. This pressure-medium passage or annular space 416d is connected to the blind bore of the pneumatic connection 430d via radial bores 432d in the second housing part 402d. Furthermore, the second valve element 94d has a long hole 440d which runs obliquely to the valve axis B" or obliquely to a projection of the valve axis B" onto the surface of the cylindrical wall portion 414d of the second valve element 94d and which, apart from the circular-cylindrical curvature of the wall portion 414d, extends rectilinearly in the axial direction and in the circumferential direction and is open radially inward to the annular space 416d. The long hole 440d is open radially outward to the inner surface of the wall portion 412d of the first valve element. In other words, the long hole 440d is delimited radially outward by the inner surface of the wall portion 412d.

The first valve element 92d has, in the wall portion 412d, two pressure-medium passage orifices 442d and 444d which, like the pneumatic connection 48d and the pressure equalizing orifice 70d, are offset relative to one another in the circumferential direction, but not in the axial direction. The two pressure-medium passage orifices 442d and 444d in the first valve element 92d cooperate with the pressure-medium passage orifice, in the form of the long hole 440d, in the second valve element 94d, in order to implement the control states of the valve. Depending on the position of the two valve elements relative to one another, only the pressure-medium passage orifice 442d or only the pressure-medium passage orifice 444d opens to the long hole 440d or both pressure-medium passage orifices 442d and 444d are closed radially inward by the wall portion 414d of the second valve element, said wall portion surrounding the long hole 440d. This is explained in more detail below.

The two pressure-medium passage orifices 442d and 444d open radially outward into a respective axially parallel groovelike recess 446d and 448d on the outside of the wall portion 412d of the first valve element 92d, said outside therefore being closed radially inward (apart from the pressure-medium passage orifice 442d or 444d) and being open radially outward to the inside of the cylinder wall 404d. The two recesses 446d and 448d are arranged in such a way and have such an axial length that there is always (that is to say, irrespective of the instantaneous axial position of the first valve element 92d) a pressure-medium connection (here a pneumatic connection) between the pneumatic connection 48d and pressure-medium passage orifice 442d via the recess 446d and a pressure-medium connection (here a pneumatic connection) between the pressure equalizing orifice 70d and the pressure-medium passage orifice 444d via the recess 448d. The pneumatic connection 48d is therefore always covered radially inward by the recess 446d and is thus open to the latter, and the pressure equalizing orifice 70d is therefore always covered radially inward by the recess 448d and is thus open to the latter. The presence or absence of a pneumatic connection between the pneumatic connection 48d and pneumatic connection 430d or between the pressure equalizing orifice 70d and pneumatic connection 430d thus depends solely on the relative position of the two valve elements, more precisely on the resulting overlap or nonoverlap between the pressure-medium passage orifice 442d and long hole 440d or between the pressure-medium passage orifice 444d and the long hole 440d.

The movability of the two valve elements 92d and 94d relative to one another is restricted by fitting means which comprise a stud 450d, projecting radially outward from the second valve element 94d and integral with the latter, and a long hole 452d in the wall portion 412d of the first valve element 92d, said long hole running obliquely to the valve axis B" or to a generating line parallel to the valve axis B" (=projection of the valve axis B" onto the surface of the cylindrical wall portion 412d) of the first valve element 92d, and the stud 450d fitting into said long hole. So that the two valve elements can be introduced one into the other so as to make the fit between the stud 450d and the long hole 452d, the long hole 452d is open toward that end of the first valve element 92d which is opposite the end wall 418d. In order to make a distinction from the long hole 440d, serving as a pressure-medium passage orifice, in the second valve element 94d, the long hole 452d is designated below in brief as a slot 452d in the first valve element 92d.

The stud 450d on the second valve element projects radially outward beyond the cylinder wall 404d through an orifice 454d in the cylinder wall 404d of the first housing part 400d and serves for the motional coupling of the second valve element 94d to the disengagement bearing arrangement or the disengagement bearing arrangement side of the pressure-medium power cylinder arrangement (here, the pneumatic cylinder arrangement). One rotary position of the second valve element 94d in the valve housing 90d thus corresponds to each axial position of the disengagement bearing arrangement, there being an unequivocal relation between the axial position of the disengagement bearing arrangement and the associated rotary position of the second valve element 94d. The instantaneous position of the disengagement bearing arrangement is thus represented as an actual value by the position of the second valve element. If the control valve 42d is integrated into the control valve structural unit 40 of FIG. 1, then the coupling element 74 projecting from the control valve structural unit 40 may be articulated on the stud 450d inside the control valve structural unit 40, in order to provide motional coupling between the second valve element 94d and the disengagement bearing arrangement 32.

For the proper functioning of the control valve in spite of the clutch wear which occurs in course of time, that boundary edge 456d of the slot 452d which is more remote from the end wall 418d of the first valve element in a longitudinal section through the first valve element 92d is important. If the hydraulic slave cylinder 420d is not loaded with hydraulic oil from the associated master cylinder, the first valve element 92d is displaced by the pressure force of the spring 424d in the direction of the end wall 406d of the first housing part 400d, until the boundary edge 456d, which may also be designated as a control edge, of the slot 452d also butts on the stud 450d. This applies irrespective of the axial position of the disengagement bearing arrangement, that is to say even when the clutch is fully engaged. In the course of commencing and increasing clutch wear, the rotary position of the second valve element 94d will change, specifically in the direction of the arrow V drawn in FIG. 8, when the associated friction clutch is in the fully engaged state (basic state). This direction of rotation of the second valve element 94d or of the stud 450d is opposite to the direction of rotation of the second valve element 94d or stud 450d during the disengagement of the clutch (arrow A in FIG. 8). In accordance with the rotation of the second valve element 94d, caused by clutch wear, in the coupled state, the cooperation of the stud 450d with the boundary edge 456d of the slot 452d of the first valve element 92d gives rise to a corresponding displacement, caused by clutch wear, of the basic state position, assumed by the first valve element 92d in the fully coupled state, without clutch actuation, along the valve axis B" in the direction of the end wall 406d of the first housing part 400d, that is to say with the effect of reducing the hydraulic slave cylinder 420d.

With the cooperation of the spring 424d, by means of the stud 450d and said boundary edge 456d, when the actuating device is in the basic state without clutch pedal actuation (with the clutch fully engaged), the first valve element 92d is always, that is to say irrespective of the state of wear of the clutch linings, held in a defined relative position in relation to the second valve element. The profile of the boundary edge 456d corresponds to the profile of the long hole 440d, so that, in the basic state, identical conditions always prevail with respect to the long hole 440d and the pressure-medium passage orifices 442d and 444d, specifically a complete overlap between the long hole 440d and the pressure-medium passage orifice 444d leading to the pressure equalizing orifice 70d (cf., in particular, FIGS. 9 and 14, which, like FIGS. 8, 10 to 13, show the control valve in the basic state, without clutch actuation and with the clutch fully engaged, in the case of average clutch wear). In said basic state, therefore, a pneumatic connection is always made between the pneumatic cylinder arrangement and the pressure equalizing orifice 70d.

If the hydraulic slave cylinder 420d is loaded with hydraulic oil in the course of clutch pedal actuation, axial displacement of the first valve element 92d counter to the force of the spring 424d takes place under the action of the inflowing hydraulic oil. In this case, the width of the slot 452d in the first valve element is dimensioned in such a way that, if the other boundary edge 458d, which runs parallel to the boundary edge 456d (that is to say, so as to correspond to the long hole 440d), butts on the stud 450d of the second valve element 94d, there is an at least partial overlap between the long hole 440d and the pressure-medium passage orifice 442d, although the passage orifice 442d in the axially displaced first valve element 92d has, in any event, not yet run over the long hole 440d, so that, in any event, a pneumatic connection is made between the pneumatic source, not shown, and the pneumatic cylinder arrangement. The foregoing statement applies on the assumption, usually unrealistic, that the second valve element has not yet been rotated out of the position of rest in the direction of the arrow A (FIG. 8) as a result of a supply of compressed air to the pneumatic cylinder arrangement, so that the boundary edge 458d may possibly butt on the stud 450d.

The already above-indicated functioning of the control valve becomes clearer from a consideration of FIGS. 15a to f which show a series of cross sections through the control valve of FIGS. 8 to 14 for various positions of the valve elements in the course of a disengagement of the clutch. The figures are idealized and unrealistic insofar as a rotation of the second valve element following from a displacement of the first valve element via a change in the position of the disengagement bearing arrangement is not already taken into account in the same partial figure. The figures therefore correspond to a situation where, in the case of a transition from one partial figure to the next, in each case one of the two valve elements has been retained or the clutch has been actuated only in steps, in order to illustrate its movements separately from one another for the sake of greater clarity.

Figure 15A:
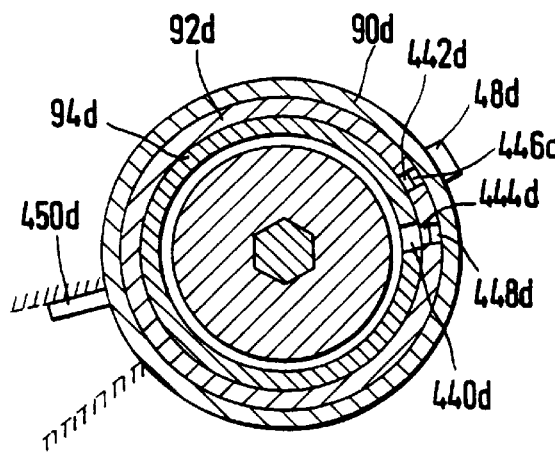
FIG. 15 shows, in FIGS. 15a to 15f, cross sections through the control valve of FIGS. 8 and 9 for various positions of the valve elements relative to one another and relative to the valve housing, in order to explain the functioning of the control valve in the case of a variation in the command variable in one direction (corresponding to clutch actuation for the uncoupling of the clutch).
Figure 15D:
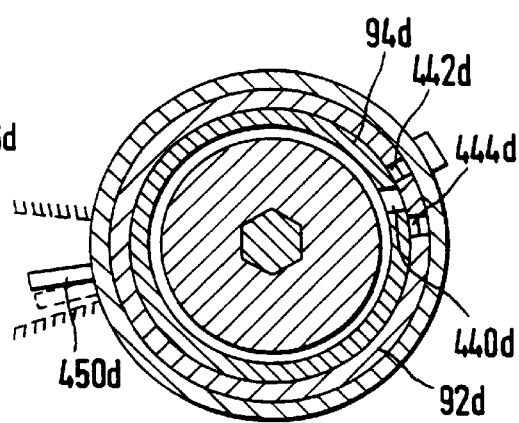
Figure 15B:
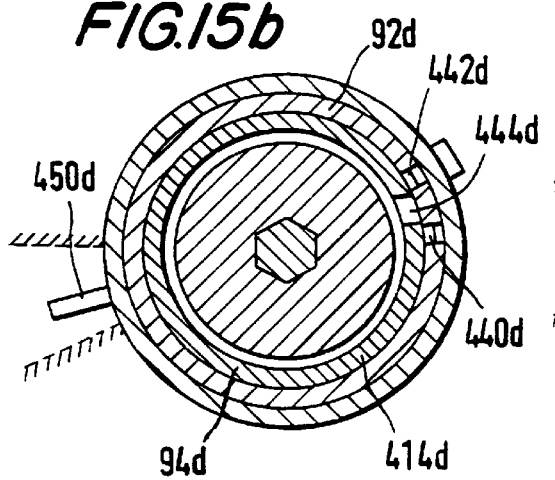
Figure 15E:
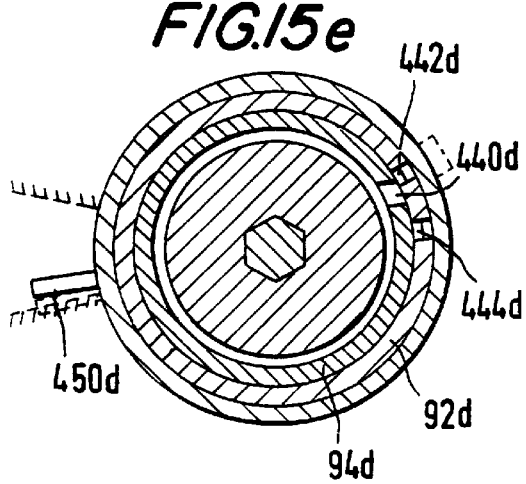
Figure 15C:
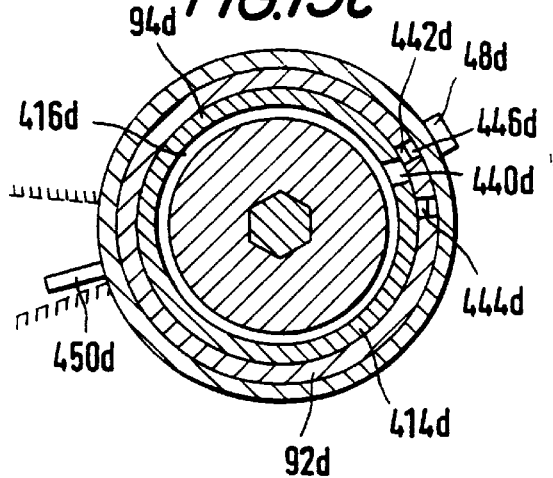
Figure 15F:
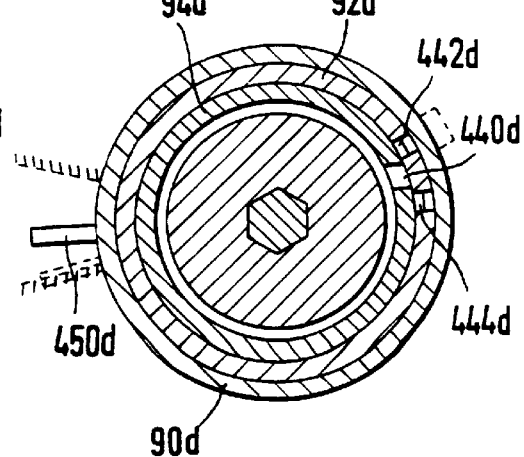
Figure 16A:
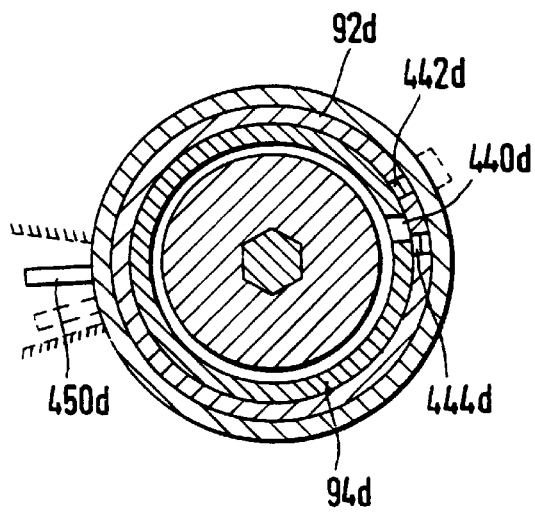
FIG. 16 shows, in FIGS. 16a to 16e, cross sections through the control valve of FIGS. 8 and 9 for various positions of the valve elements relative to one another and relative to the valve housing in the case of a variation in the command variable in the opposite direction (corresponding to clutch actuation for copuling the clutch).
Figure 16D:
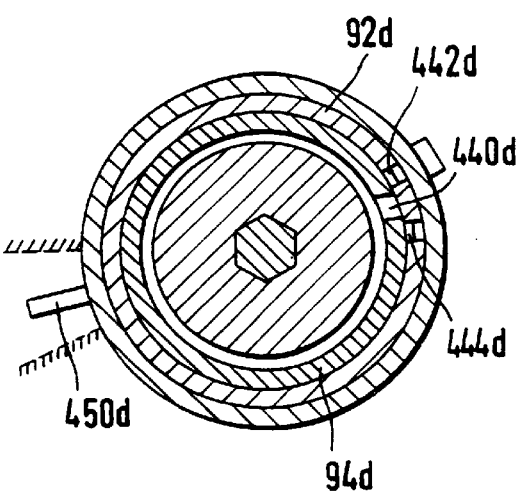
Figure 16B:
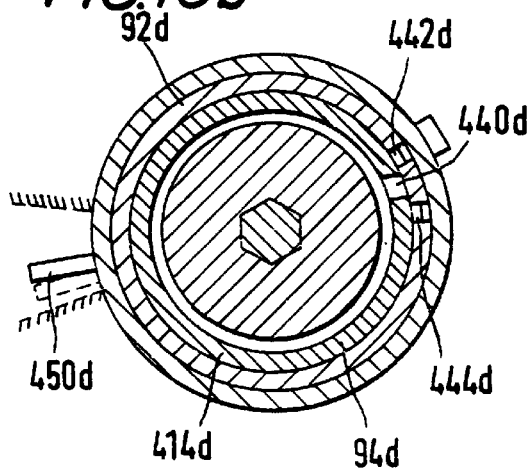
Figure 16E:
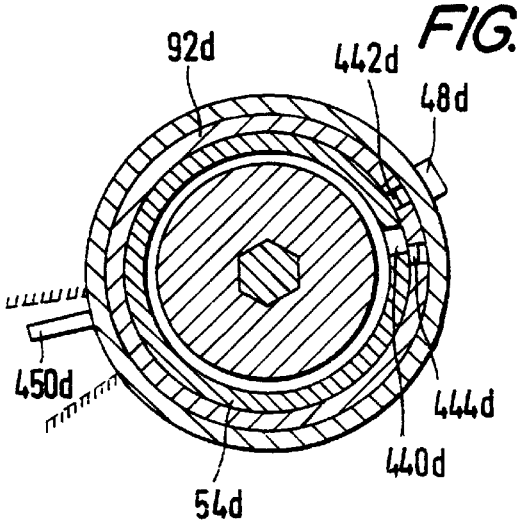
Figure 16C:
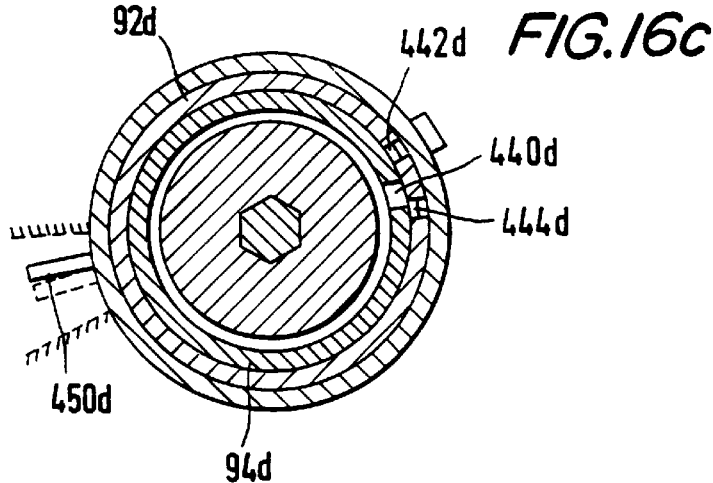

FIGS. 15a to 15f show in each case a cross section through the control valve in a plane intersecting the two pressure-medium passage orifices 442d and 444d. Depending on the axial position of the first valve element 92d, therefore, this results in a different position of the sectional plane in relation to the valve housing 90d and the second valve element 94d. In FIGS. 15e and 15f, the pneumatic connection 48d is represented by dashed lines, since it is unimportant whether the sectional plane passes through the pneumatic connection 48d (and correspondingly through the pressure outlet orifice 70d) or not.

The possible range of rotation of the second valve element 94d relative to the first valve element 92d or the rotatability of the stud 450d between the boundary edge 456d and the boundary edge 458d of the slot 452d is indicated in the figures in each case by dashed limits. In the course of the axial displacement of the first valve element 92d counter to the force of the spring 424d, the boundary edge 458d approaches the stud 450d, so that, for the axial position of the first valve element 92d reached in each case, the result is a different rotary angle range, made possible by the slot 452d, for the rotation of the second valve element 94d relative to the first valve element 92d. In this case, depending on the axial position of the first valve element 92d, the long hole 440d appears in a different angular position in the respective cross section, so that the second valve element appears rotated, insofar as the rotary position of the stud 450d, which clearly indicates the rotary position of the second valve element 94d, is not taken into account.

FIG. 15a corresponds to the situation of FIG. 14. The clutch is engaged, and the long hole 440d and pressure-medium passage orifice 444d are in overlap, so that a pressure-medium connection (here, a pneumatic connection) is made between the pressure equalizing orifice 70*d* and the pneumatic cylinder arrangement. In the course of clutch pedal actuation, the first valve element 92*d* is displaced axially counter to the force of the spring 424*d*. FIG. 15*b* shows an intermediate position, in which the two pressure-medium passage orifices 442*d* and 444*d* in the first valve element 92*d* are closed by the wall portion 414*d* of the second valve element 94*d*, said wall portion delimiting the long hole 440*d*. The disengagement bearing arrangement and, correspondingly, also the second valve element 94*d* have not yet moved, since it has not yet been possible to supply any compressed air to the pneumatic cylinder arrangement.

In FIG. 15*c*, the first valve element 92*d* has reached an axial position, in which the pressure-medium passage orifice 442*d* partially overlaps the long hole 440*d*. The pressure-medium passage orifice 444*d* is closed by the wall portion 414*d*. There is, correspondingly, a pneumatic connection between the pneumatic source, not shown, and the pneumatic cylinder arrangement via the pneumatic connection 48*d*, the groovelike recess 446*d*, the pressure-medium passage orifice 442*d*, the long hole 440*d*, the annular space 416*d*, the radial bores 432*d*, which cannot be seen in FIG. 15, and the pneumatic connection 430*d*, whereas the pressure equalizing orifice 70*d* is separated from the pneumatic cylinder arrangement. In FIG. 15*c*, the second valve element 94*d* is shown nonrotated relative to FIGS. 15*a* and 15*b*; the disengagement bearing arrangement has therefore not yet moved.

The rotation of the second valve element 94*d*, following due to the pneumatic connection being made between the pneumatic source and the pneumatic cylinder arrangement and from the resulting displacement of the disengagement bearing arrangement, with the first valve element 92*d* being retained, is shown in FIG. 15*d*. The second valve element has rotated relative to its original position in FIGS. 15*a,b,c* in the clockwise direction, so that both pressure-medium passage orifices 442*d* and 444*d* are closed again. Such a situation may, as a rule, occur only when the first valve element 92*d* is displaced stepwise in the axial direction in the course of clutch actuation, for example a corresponding stepwise depression of the clutch pedal. FIG. 15*e* then shows the situation when the first valve element 92*d* is displaced further in the axial direction, so that a pneumatic connection is made once more between the pneumatic source and the pneumatic cylinder arrangement via the pressure-medium passage orifice 442*d* and the long hole 440*d*. As a rule, the movements illustrated in FIGS. 15*c*, 15*d* and 15*e* must not be separated from one another, in any event not when the first valve element 92*d* is displaced continuously along the valve axis B" in the course of normal clutch pedal actuation taking place continuously.

Since the pressure-medium connection, here the pneumatic connection, between the pneumatic source and the pneumatic cylinder arrangement is made again according to FIG. 15*e*, the disengagement bearing arrangement is disengaged further under the action of the inflowing compressed air, along with a corresponding rotation of the second valve element 94*d*, FIG. 15*f* showing an intermediate state or a final state, in which the two pressure-medium passage orifices 442*d* and 444*d* are closed by the wall portion 414*d* of the second valve element 94*d* again. It is assumed from this that the volume of the master cylinder (here, the master cylinder actuated by the clutch pedal) assigned to the slave cylinder 420*d* is dimensioned in such a way that FIG. 15*f* shows a final state which occurs, during the maximum depression of the clutch pedal in the fully disengaged state, when the axial position of the disengagement bearing arrangement corresponds to the desired value (=command variable) predetermined by the axial position of the first valve element 92*d*. The difference quantity between the actual value and the command variable, said difference quantity being represented by the relative position of the two valve elements, therefore assumes the value zero in the situation according to FIG. 15*f*.

As may be gathered from the original position of the stud 450*d*, marked by dashed lines in FIGS. 15*d*, 15*e* and 15*f*, as compared with the angular range permitted for the stud 450*d* by the slot 452*d*, the rotary angle of the second valve element 94*d*, as compared with the fully engaged state according to FIG. 15*a*, is somewhat greater than the rotary angle range permitted by the slot 452*d* when the first valve element 92*d* is retained. However, the rotary angle of the second valve element 94*d*, said rotary angle corresponding to full disengagement of the clutch, could also be markedly greater than the rotary angle range permitted by the slot 452*d* when the first valve element 92*d* is retained, could correspond exactly to this, or, in the case of a corresponding design of the long hole 440*d* and of the pressure-medium passage orifices 442*d* and 444*d*, could also be smaller than the rotary angle permitted by the slot 452*d* when the first valve element 92*d* is retained. This may be set by an appropriate coordination of the volumes or dimensions of the slave cylinder 420*d* and of the associated master cylinder.

What was said as regards FIG. 15 applies to the series of cross sections which is shown in FIG. 16 and which shows the cycle of movement of the valve elements during coupling. FIG. 16*a* shows a situation, in which the first valve element 92*d* has again moved a little way in the direction of the end wall 406*d* of the valve housing 90*d* as a result of the action of the compression spring 424*d*, as compared with the axial end position according to FIG. 15*f*, since the clutch pedal has been transferred into a less sharply depressed position or has been released and, correspondingly, it has been possible for hydraulic oil to flow out of the hydraulic slave cylinder 420*d* back to the master cylinder assigned to the clutch pedal. In the position of the first valve element 92*d*, as shown in FIG. 16*a*, as compared with the situation in FIG. 15*f*, another portion of the long hole is level with the pressure-medium passage orifices 442*d* and 444*d*, said portion partially overlapping with the pressure-medium passage orifice 444*d* connected to the pressure equalizing orifice 70*d*, so that compressed air from the pneumatic cylinder arrangement can then flow out of the pressure equalizing orifice 70*d* via the control valve, so that the disengagement bearing arrangement can be moved axially in the coupling direction by means of the force of the diaphragm spring of the clutch. FIG. 16*b* shows an intermediate position, with the first valve element 92*d* retained in the position according to FIG. 16*a*, in which intermediate position the second valve element 94*d* has been rotated back in the direction of the position of rest according to FIG. 15*a*, until the pressure-medium passage orifices 442*d* and 444*d* are just concealed again by the wall portion 414*d* delimiting the long hole 440*d*. In the course of further backward movement of the first valve element 92*d* in the direction of the end wall 406*d*, the situation according to FIG. 16*c* then arises, in which the venting connection between the pneumatic cylinder arrangement and the pressure equalizing orifice is made again via the long hole 440*d* and the pressure-medium passage orifice 444*d*. In FIG. 16*d*, the second valve element 94*d* has then reached its rotary end position or rotary position of rest again, corresponding to the situation according to FIG. 15a, while the first valve element 92d is still displaced in relation to the axial position according to FIG. 15a. Via an intermediate position shown in FIG. 16e, the first valve element 92d then reaches the end position or position of rest according to FIG. 15a, which is predetermined by the boundary edge 456d of the slot 452d and in which the then critical portion of the long hole 440d completely overlaps the pressure-medium passage orifice 444d, so that the venting connection, which is permanent in the basic state of the actuating device, is made between the pneumatic cylinder arrangement and the pressure equalizing orifice 70d via the control valve.

The foregoing description of FIGS. 15 and 16, which, as stated, separate the movements of the first valve element 92d and the second valve element 94d from one another, in part unrealistically, makes it clear that, during an axial displacement of the first valve element 92d, the axial position of which represents the command variable, different portions of the long hole 440d are arranged successively at the same height as the pressure-medium passage orifices 442d and 444d in the first valve element 92d and are therefore critical in terms of the control function of the control valve (changeover between the three control states). Due to the oblique position of the long hole 440d in the second valve element, the portions of the long hole 440d which are in each case critical are located in different angular positions, either the long hole 440d at least partially covering the pressure-medium passage orifice 442d connected to the pneumatic connection 48d or the long hole 440d at least partially covering the pressure-medium passage orifice 444d connected to the pressure equalizing orifice 70d or both pressure-medium passage orifices 442d and 444d being completely closed by the wall portion 414d delimiting the long hole 440d. If only the cross sections according to FIGS. 15 and 16 are considered, without the angular position of the stud 450d being taken into account, there is a close similarity to the situation in the exemplary embodiment according to FIG. 5, the long hole 440d being matched with the bore 202d and the two pressure-medium passage orifices 442d and 444d being matched with the perforations 210b and 212b. However, in the exemplary embodiment of FIG. 5, the assignment of the valve elements to the command variable and the actual value is reversed. In a similar way to the exemplary embodiment of FIG. 5, those portions of the first or second valve element which delimit the long hole 440d and the pressure-medium passage orifices 442d and 444d may be interpreted as control edges which expose or block the pressure-medium connections within the control valve when they are moved past an associated pressure-medium passage orifice.

Figure 17:
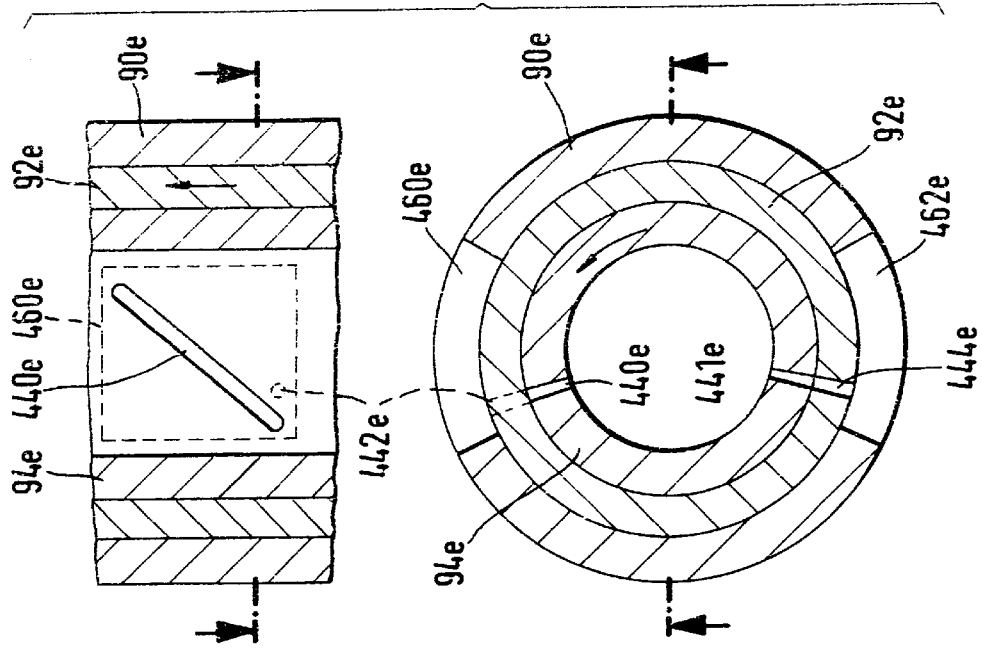

Instead of a single long hole 440d in the second valve element 94d according to the exemplary embodiment of FIGS. 7 to 16, said long hole serving, in cooperation with a pressure-medium passage orifice 442d, on the one hand, and 444d, on the other hand, for making a pneumatic connection between the pneumatic cylinder arrangement and pneumatic source, on the one hand, and the pneumatic cylinder arrangement and pressure equalizing orifice 70d, on the other hand, two separate long holes 440d, offset relative to one another in the circumferential direction, may also be provided, of which one serves for connecting to the pneumatic connection of the control valve and the other for making the connection with the pressure equalizing orifice. A control valve with two separate long holes in the radially inner rotatable second valve element 94e is shown diagrammatically in FIG. 17 with regard to the basic state of an actuating device comprising the valve (basic state with the clutch fully engaged and without clutch actuation), the upper part of FIG. 17 showing a longitudinal section in a plane through the control valve, said plane comprising the valve axis, and the lower part of FIG. 17 showing a cross section orthogonally to the valve axis. In the upper part of FIG. 17, the cross-sectional plane for the lower part of FIG. 17 is indicated by dashed lines and with a viewing direction indicated by arrows. Correspondingly, in the lower part of FIG. 17, the sectional plane and the viewing direction for the upper part of FIG. 17 are indicated by arrows.

In the control valve of FIG. 17, the long hole 440e, illustrated diagrammatically in the upper part of FIG. 17, serves for making a pressure-medium connection between the pressure-medium cylinder arrangement and an associated pressure-medium source via the long hole 440e in the second valve element 94e and via the associated pressure-medium passage orifice 442e in the radially outer displaceable first valve element 92e. The pressure-medium connection is not shown in detail; a large-area perforation 460e in the valve housing 92e is shown merely diagrammatically and may be thought of as a pressure-medium connection, in particular a pneumatic connection, in order to understand the functioning of the control valve.

A second long hole 441e is likewise provided in the second valve element, so as to be approximately opposite the long hole 440e with respect to the longitudinal sectional plane, and covers a pressure-medium passage orifice 444e in the axially displaceable first valve element 92e. The pressure-medium passage orifice 444e opens to a perforation 462e in the valve housing 90e, said perforation serving as a pressure equalizing orifice.

If the first valve element 92e, the axial position of which represents the command variable, is moved in the direction of the arrow (see the upper part of FIG. 17) as a result of clutch actuation, in particular the actuation of the clutch pedal, overlap finally occurs between the long hole 440e and the pressure-medium passage orifice 442e, whereas, previously, the overlap of the long hole 441e and of the pressure-medium passage orifice 444e was already canceled, so that a pressure-medium connection is then made between the pressure-medium source and the pressure-medium cylinder arrangement via the pressure-medium passage orifice 442e and the long hole 440e. A resulting disengagement movement of the disengagement bearing arrangement is converted into a corresponding rotational movement of the second valve element 94e in the direction of the arrow in the lower part of FIG. 17, until the actual value is equal to the desired value (=command variable), both pressure-medium passage orifices 442e and 444e are covered by wall portions of the second valve element 94e, said wall portions delimiting the long holes 440e and 441e, and the pressure-medium cylinder arrangement is correspondingly separated both from the pressure-medium source and from the pressure-medium equalizing orifice, so that the disengagement bearing arrangement maintains the axial position which is reached. When the clutch pedal is then released again, corresponding movements (axial displacement of the first valve element 92e and rotation of the second valve element 94e) occur in the opposite direction, until the state according to FIG. 17 is reached again. Reference may be made, in this respect, to the statements regarding FIGS. 15 and 16, which may readily be transferred to the FIG. 17. It should also be added that the two long holes 440e and 441e are constantly connected to the pneumatic cylinder arrangement via the tubular inner space of the control valve, said inner space being delimited by the second valve element 94e, and via a pressure-medium connection, not shown, so that the control states are implemented solely by the two long holes 440e and 441e in cooperation with the pressure-medium passage orifice 442e and 444e respectively.

Figure 18:
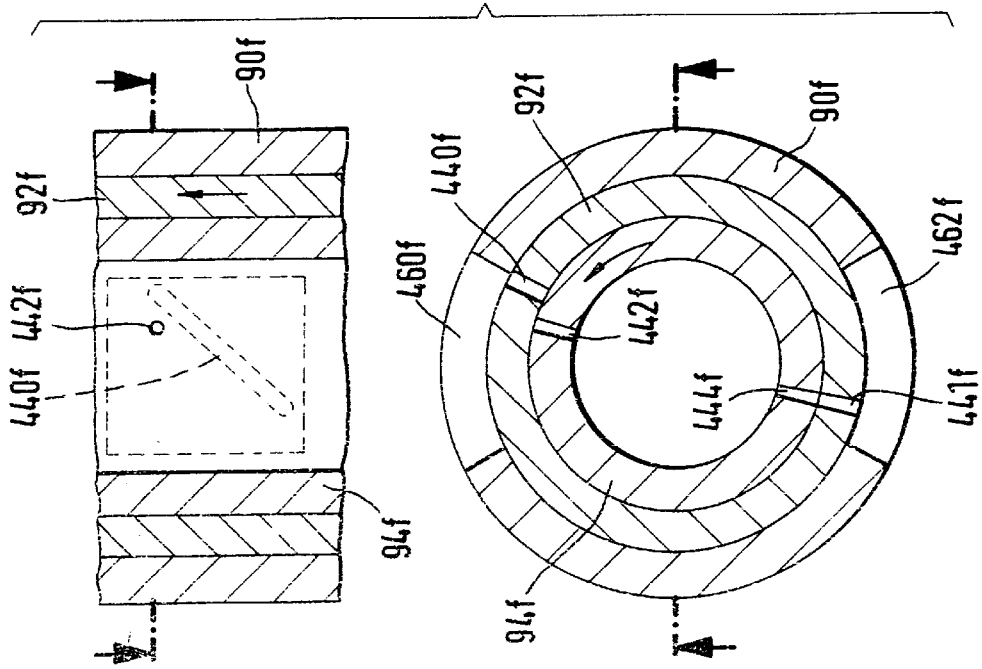

The control valve of FIG. 18 differs from the control valve of FIG. 17 in that the two long holes 440f and 441f are provided in the axially moveable first valve element 92f representing the command variable, whereas the pressure-medium passage orifice 442f cooperating with the long hole 440f and the pressure-medium passage orifice 444f cooperating with the long hole 441f are provided in the rotatable second valve element 94f. This results in a somewhat different arrangement of the long holes and pressure-medium passage orifices relative to one another from that in the case of the control valve of FIG. 17.

FIG. 19 shows a control valve, in which the radially inner rotatable valve element serves as the first valve element 92g representing the command variable, whereas the radially outer axially displaceable valve element serves as the second valve element 94g representing the actual value. As in the case of the control valve of FIG. 18, the radially outer displaceable valve element, here the second valve element 94g, has the two long holes 440g and 441g, and the radially inner rotatable valve element, here the first valve element 92g, has the two pressure-medium passage orifices 442g and 444g. As compared with the example according to FIG. 18, the different assignment of the two valve elements in terms of the representation of the command variable and actual value results in a different relative arrangement of the long holes and pressure-medium passage orifices.

The control valve of FIG. 20 differs from the control valve of FIG. 19 in that the first valve element 92h, which is located radially inward and is rotatable, has the two long holes 440h and 441h, whereas the two pressure-medium passage orifices 442h and 444h are provided in the radially outer axially displaceable valve element, here the second valve element 94h. This results in a corresponding arrangement of the long holes and pressure-medium passage orifices relative to one another.

In the exemplary embodiments of FIGS. 17 to 20, in each case the radially outer valve element is the axially displaceable valve element, relative to which the radially inner valve element is rotatable. A reversed situation is shown in the exemplary embodiments of FIG. 21 to FIG. 24, in which the radially inner valve element is the displaceable valve element, relative to which the radially outer valve element is rotatable.

In the two exemplary embodiments of FIGS. 21 and 22, in each case the displaceable radially inner valve element serves as the first valve element 92j and 92k representing the command variable, whereas the radially outer rotatable valve element serves as the second valve element 94j and 94k representing the actual value. In the exemplary embodiment of FIG. 21, the second valve element 94j has the long holes 440j and 441j, whereas the pressure-medium passage orifices 442j and 444j are provided in the first valve element 92j. In contrast to this, in the exemplary embodiment of FIG. 22, the pressure-medium passage orifices are provided in the second valve element 94k and the long holes are provided in the first valve element 92k.

Figure 24:
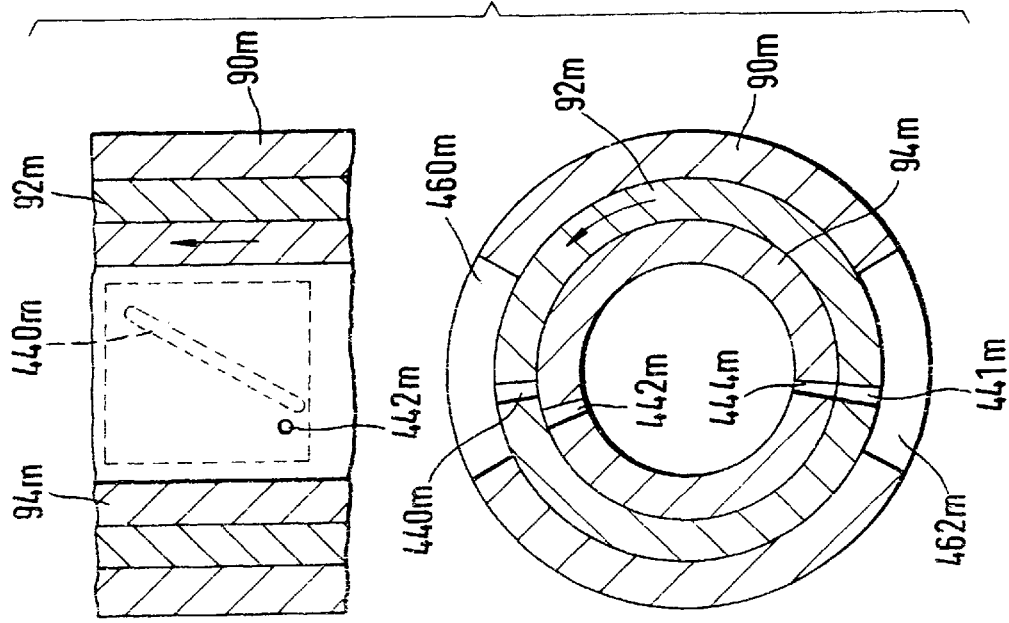
Figure 23:
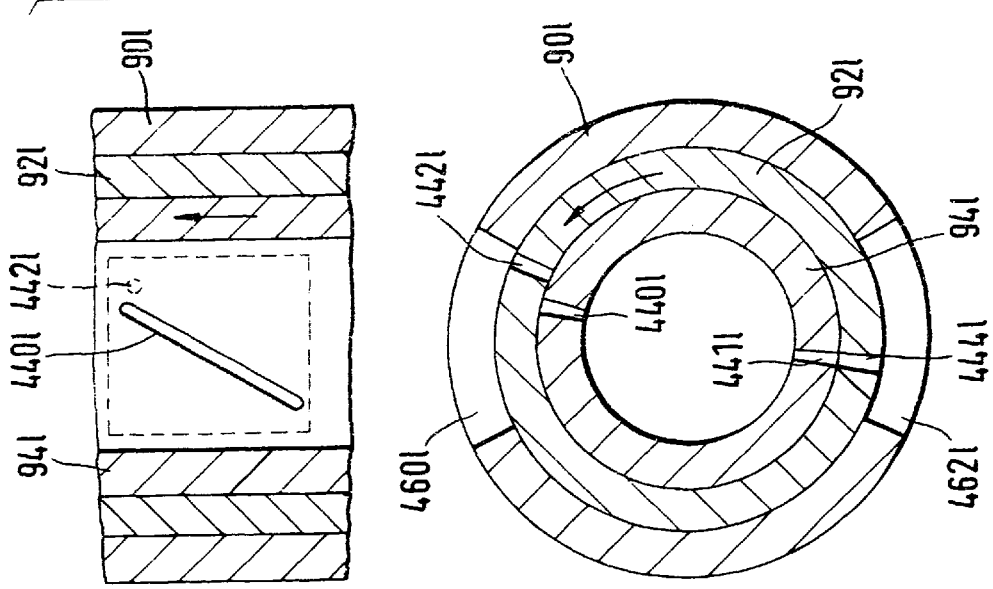

The two exemplary embodiments of FIGS. 23 and 24 differ from the exemplary embodiments of FIGS. 21 and 22 in that the radially outer rotatable valve element serves as the first valve element 92l and 92m representing the command variable, while the radially inner displaceable valve element serves as the second valve element 94l and 94m representing the actual value. In the exemplary embodiment of FIG. 23, the long holes 440l and 441l are provided in the second valve element 94l and the associated pressure-medium passage orifices 442l and 444l are provided in the first valve element 92l. In contrast to this, in the exemplary embodiment according to FIG. 24, the first valve element 92m has the long holes 440m and 441m, whereas the second valve element 94m has the pressure-medium passage orifices 442m and 444m.

In all the exemplary embodiments of FIGS. 17 to 24, the relative arrangement of the long holes and associated pressure-medium passage orifices in the basic state shown in the figures, with the clutch engaged without clutch pedal actuation, is coordinated with the assignment of the valve elements to the command variable and actual value, with the type of movability of the respective valve element (rotatable or displaceable) and with which valve element has the long holes and which valve element has the pressure-medium passage orifices, so the control valve performs its functions properly. It should also be pointed out that the two long holes do not have to be provided in the same valve element. Thus, the first valve element may have the long hole 440 and the pressure-medium passage orifice 444 and the second valve element the long hole 441 and the pressure-medium passage orifice 442, and vice versa.

Figure 25:
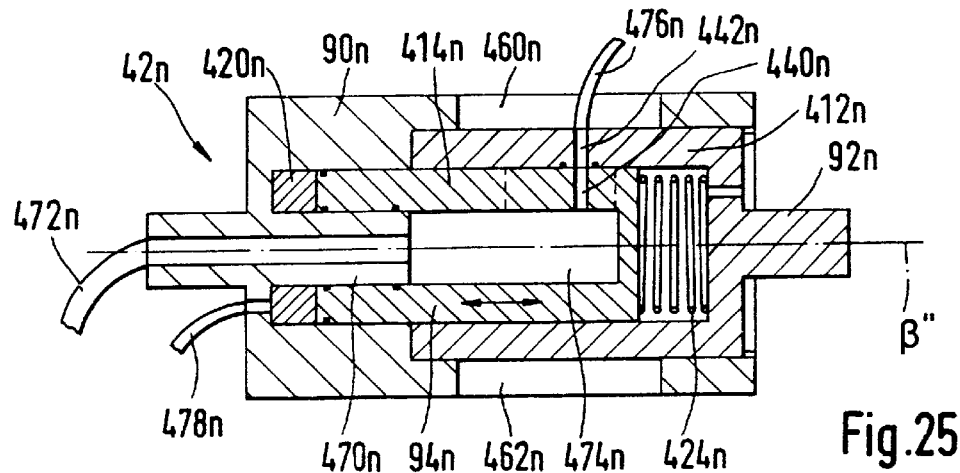
FIG. 25 to FIG. 30 show six further exemplary embodiments of a control valve according to the invention.
Figure 26:
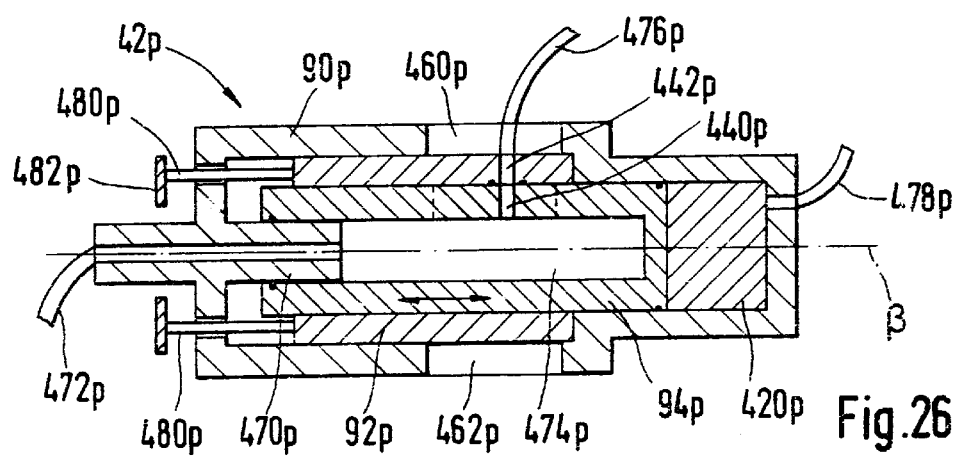
Figure 27:
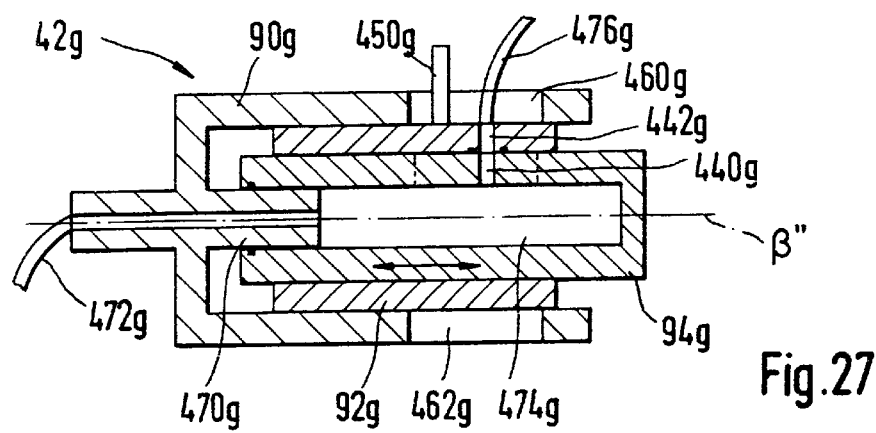

FIGS. 25 to 27 show three actual exemplary embodiments of a control valve corresponding essentially to the control valve of FIG. 23. The control valve of FIG. 25 has a housing 90n with an inner tubular portion 470n which is connected via a connecting line 472n to the associated pressure-medium cylinder arrangement and which is open inward to an inner space 474n of the control valve. The tubular portion 470n is radially surrounded externally by a circular-cylindrical wall portion 414n, coaxial to the valve axis B", of the axially displaceable second valve element 94n which has the two long holes. In FIG. 25, dashed lines indicate the axial extent of the long hole 440n which, with its portion lying in the sectional plane comprising the valve axis B", just overlaps with the associated pressure-medium passage orifice 442n in the radially outer circular-cylindrical wall portion 412n of the first valve element 92n rotatable about the valve axis B", so that a pressure-medium connection is made between a pressure-medium source, not shown, and the pressure-medium cylinder arrangement via a pressure-medium line 476n, the pressure-medium passage orifice 442n, the long hole 440n, the inner space 474n, the tubular portion 470n and the pressure-medium line 472n. The resulting movement of the disengagement bearing arrangement is transmitted via a hydraulic line 478n to the second valve element 94n by means of a hydraulic master cylinder which is assigned to the disengagement bearing arrangement and which serves as a measuring cylinder. For this purpose, a hydraulic slave cylinder 420n is formed in the control valve 42n, said slave cylinder being in the form of an annular cylinder which surrounds the tubular portion 470n and to which the second valve element 94n is assigned as an annular piston. A disengagement movement of the disengagement bearing arrangement is correspondingly converted hydraulically into an axial movement of the second valve element 94n counter to the force of a prestressing spring 424n. The control valve may expediently be used directly on the clutch pedal, since, here, the rotational movement of the clutch pedal about its rotary mounting can easily be transmitted directly to the first valve element 92n by means of its tenon portion projecting from the control valve housing, without complicated intermediate members being necessary. The advantage of coupling the second valve element hydraulically to the disengagement bearing arrangement is that a hydraulic stepup is possible, so that the regulating travel (control travel) does not have to be equal to the disengagement travel.

The control valve of FIG. 26 corresponds largely to the control valve of FIG. 25. However, the hydraulic slave cylinder 420p is provided at the other axial end of the second valve element 94p. Coupling rods 480p, which project through arcuate passages at the valve end opposite to the slave cylinder 470p and which, at their end projecting from the control valve, carry a coupling ring 482p, serve for presetting the command variable, that is to say the rotary position of the first radially outer valve element 92p. The coupling ring 482p could be designed, for example, as a gearwheel with, on its outer circumference, a toothed rim, by means of which the rotational movement of the clutch pedal when the latter is depressed could be converted into a corresponding rotational movement of the first valve element 92p.

In contrast to the control valve of FIG. 26, no hydraulic slave cylinder is provided in the control valve of FIG. 27, but, instead, an end portion of a second valve element 94q projects from the valve housing, the disengagement bearing arrangement being capable, for example, of being coupled mechanically to said end portion, in order to move the second valve element 94q along the valve axis B" according to the movement of the disengagement bearing arrangement. For example, the valve may be mounted directly on the pressure-medium cylinder arrangement, in order directly to utilize the "disengagement signal". A stud 450q projecting radially from the valve housing 90q serves for coupling the radially outer rotatable first valve element 92q mechanically to a clutch pedal arrangement or the like.

Figure 28:
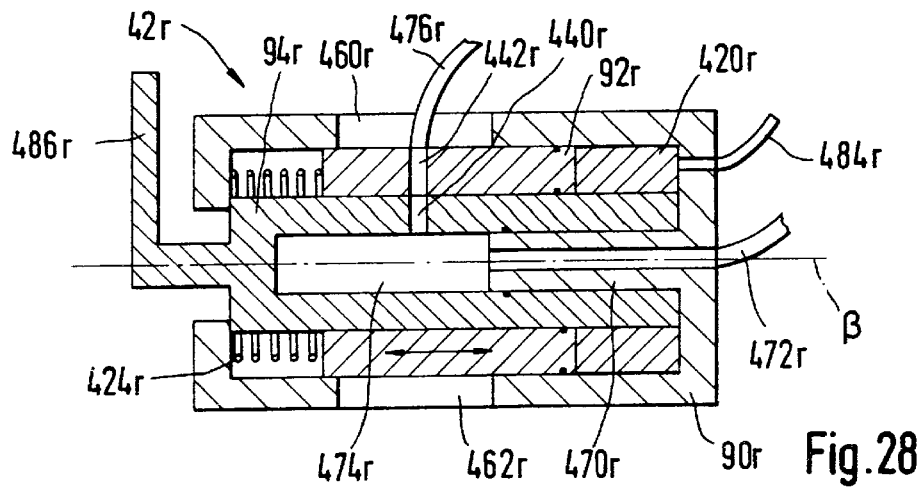

The control valve of FIG. 28 corresponds to the control valve of FIG. 17 insofar as the radially outer valve element displaceable along the valve axis B" serves as the first valve element 92r which represents the command variable, and the radially inner rotatable valve element serves as the second valve element 94r which represents the actual value, the first valve element 92r having the pressure-medium passage orifices and the second valve element 94r having the long holes. The first valve element 92r, together with an annular space in the control valve, said annular space surrounding the second valve element 94r, forms a hydraulic slave cylinder 420r which is connected via a hydraulic line 484r to a hydraulic master cylinder actuable by the clutch pedal, in order to displace the first valve element 92r along the valve axis B" according to the clutch pedal actuation. The second valve element 94r is designed integrally with a pivoting arm 486r which extends radially to the valve axis B" and which, in the case of corresponding arrangement of the control valve 42r, similar to the control valve 42b of FIG. 2, on the disengagement bearing arrangement, may serve for converting the movement of the disengagement bearing arrangement along the clutch axis into a corresponding rotational movement of the second valve element 94r. For this purpose, the pivoting arm 486r may be spring-prestressed against the disengagement bearing arrangement or the disengagement bearing arrangement side of the pressure-medium power cylinder arrangement.

Figure 29:
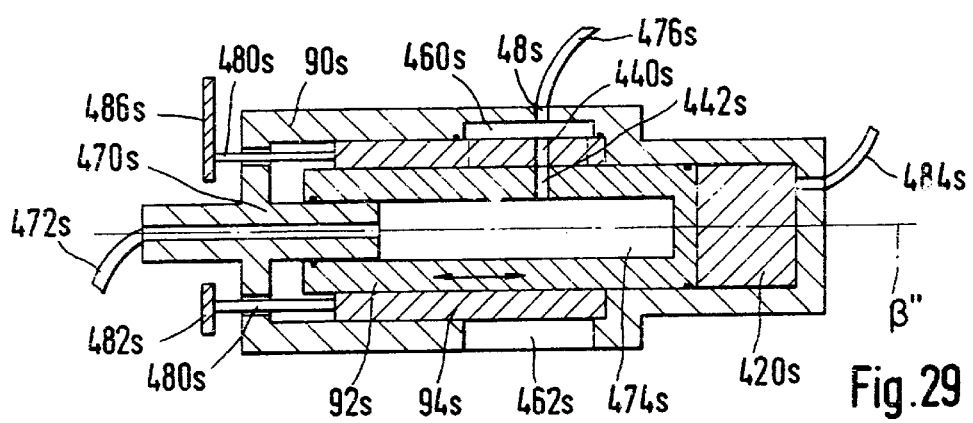

In the exemplary embodiment of FIG. 29, the relative radial arrangement of the first valve element 92s and second valve element 94s is interchanged, as compared with the exemplary embodiment of FIG. 28; thus, the rotatable second valve element 94s having the long holes is located further radially outward than the displaceable first valve element 92s having the associated pressure-medium passage orifices. For the supply of pressure medium, in particular the supply of compressed air, the orifice in the valve housing 90s, said orifice being designed as a perforation 460s in the preceding exemplary embodiments 25 to 28, is designed as a pneumatic connection 48s for the pressure-medium line 476s in the valve housing 90s, with an adjoining pressure-medium space 460s resembling an annular segment, between the valve housing wall and the second valve element 94s, in the region of the long hole 440s. In order to transmit the axial movement of the disengagement bearing arrangement to the second valve element 94s, the latter carries, in a similar way to the first valve element 92p of the exemplary embodiment of FIG. 26, coupling rods 480s which project from the valve housing at its end opposite the slave cylinder 420s and which are connected to a coupling ring 482s designed in one piece with a radially projecting coupling or pivoting arm 486s. By means of the coupling arm 486s, which, where appropriate, is spring-prestressed, the axial movement of the disengagement bearing arrangement or disengagement bearing arrangement side of the pressure-medium cylinder arrangement can be converted into a corresponding rotational movement of the second valve element 94s via the coupling ring 482s and the coupling rods 480s. It may also be pointed out that the control valve of FIG. 29 corresponds essentially to the control valve of FIG. 21.

Figure 30:
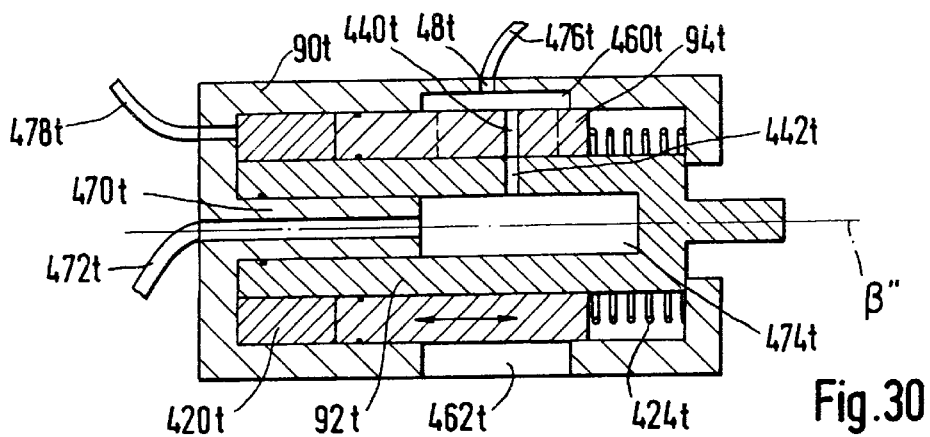

The control valve of FIG. 30 corresponds essentially to the control valve of FIG. 19 and therefore has a radially outer displaceable second valve element 94t with long holes and a radially inner rotatable first valve element 92t with the pressure-medium passage orifices assigned to the long holes. In a similar way to the exemplary embodiment of FIG. 25, the second valve element 94t forms, together with an annular space in the valve housing 90t, a hydraulic slave cylinder which is connected via a hydraulic line 478t to an associated master cylinder recording the axial position of the disengagement bearing arrangement, in order to convert the movement of the disengagement bearing arrangement or of the disengagement bearing arrangement side of the pressure-medium cylinder arrangement into a corresponding axial movement of the second valve element 94t. As in the exemplary embodiment of FIG. 25, the first valve element 92t is coupled via the tenon portion of the first valve element 92t, said tenon portion projecting from the valve housing 90t along the valve axis B", a clutch pedal with a pivot axis coaxial to the valve axis B" being capable of acting, for example directly, on said tenon portion.

Figure 31:
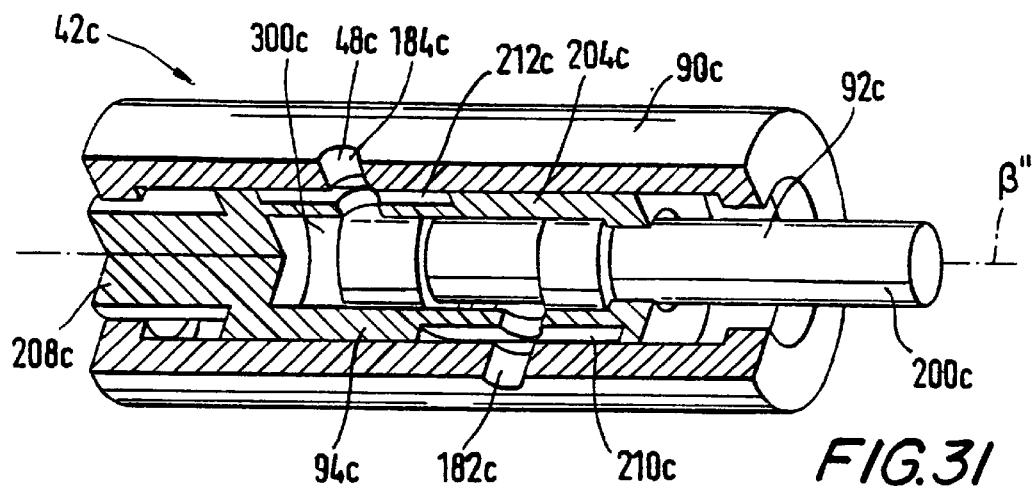
FIG. 31 shows a partially sectional perspective view of a further exemplary embodiment of a control valve according to the invention, the basic functioning of which corresponds to that of the control valve of the exemplary embodiment of FIGS. 2 to 6.

A further exemplary embodiment of a control valve according to the invention is shown in FIGS. 31 and 32 which use the small letter c for identification, in contrast to the above-mentioned order of small letters identifying the embodiments. As regards the exemplary embodiment of FIGS. 31 and 32, reference is made expressly to the foregoing description of the other exemplary embodiments, in particular of the exemplary embodiment of FIGS. 2 to 6, and only the differences between the exemplary embodiments are described.

The control valve 42c, like the control valve 42b, has two valve elements, namely a first valve element 92c and a second valve element 94c, arranged in a valve housing 90c. In contrast to the exemplary embodiment of FIGS. 2 to 6, both valve elements are displaceable along a valve axis B" and represent the command variable, the actual value and the difference quantity by means of displacement or axial positions.

There is close similarity between the control valve of FIGS. 2 to 6 and the control valve of FIGS. 31 and 32 due to the fact that the control valve of FIGS. 31 and 32, in respect of its design in the axial direction, essentially corresponds, as it were, to a "layout" of the control valve of FIGS. 2 to 6 in respect of the design of the latter in the circumferential direction or direction of rotation. Thus, each axial position of the valve elements 92c and 94c may be assigned a corresponding rotary position of the valve elements 92b and 94b.

The valve body 90c has a circular-cylindrical recess 180c which is coaxial to the valve axis B" and in which the second valve element 94c is received so as to be displaceable along the valve axis B". The second valve element 94c likewise has a circular-cylindrical recess 300c which is coaxial to the valve axis B" and in which the first valve element 92c is arranged, with a control portion 302c, so as to be displaceable along the valve axis B". The first valve element 92c has a portion 200c projecting from the valve housing 90c and receiving the command variable, and the second valve element 94c has a portion 208c projecting from the valve housing 90c on the opposite side and receiving the actual value.

The valve housing 90c has three bores 182c, 186c and 184c which are offset relative to one another in the axial direction (valve axis B") and which succeed one another in this order in the direction from the portion 200c to the portion 208c. The axial distance between the bores 182c and 186c is equal to the axial distance between the bores 186c and 184c. The bores are directed radially with respect to the valve axis B" and open out in the recess 180c of the valve housing 90c. The bores 182c, 184c, 186c are also offset relative to one another in the circumferential direction; however, this is of no further importance for the functioning of the control valve and serves merely for giving the control valve a short design in the axial direction.

The second valve element 94c has three perforations 210c, 214c and 212c offset relative to one another in the axial direction (valve axis B"), the perforations succeeding one another in said order in the direction from the portion 200c to the portion 208c. Each of said perforations is formed by an elongate recess extending in the axial direction and by a bore located radially further inward and provided in the axial center of the recess, so that a connection between the outer space of the second valve element 94c and the recess 300c provided therein can be made by means of the elongate recess and the bore. In each axial position of the second valve element 94c, the perforation 210c is open to the bore 182c, the perforation 214c is open to the bore 186c and the perforation 212c is open to the bore 184c, since the respective elongate recess of the respective perforation overlaps the respective bore in the valve housing radially inward. Thus, without the first valve element 92c being taken into account, there is always a connection between the bores 182c, 186c and 184c and the recess 300c inside the second valve element 94c and, consequently, a connection between the bores themselves.

A control portion 302c of the first valve element 92c serves, then, for opening and closing the connections between the bores 182c, 186c and 184c themselves as a function of the axial relative positions of the two valve elements. For this purpose, the control portion 302c has two closing portions 306c and 308c which in each case form a control edge and which, insofar as they overlap the radially inner bore of the respective perforation 210c or 212c, close the latter to the recess 300c in the second valve element 94c.

Between the two closing portions 306c and 308c, the control portion 302c of the first valve element 92c has a radially outwardly open annular recess forming an annular duct 202c. In each axial relative position of the two valve elements, the annular duct 202c is open at least to the perforation 214c and, consequently, to the bore 186c leading to the pressure-medium power cylinder arrangement.

Depending on the axial relative position of the two valve elements, the annular duct 202c either is open only to the perforation 214c and, consequently, to the bore 186c or is additionally also open to the perforation 212c and, consequently, to the bore 184c leading to the pressure-medium supply or open to the perforation 210c and, consequently, to t he bore 182c which serves as a pressure equalizing orifice 70c.

Figure 32A:
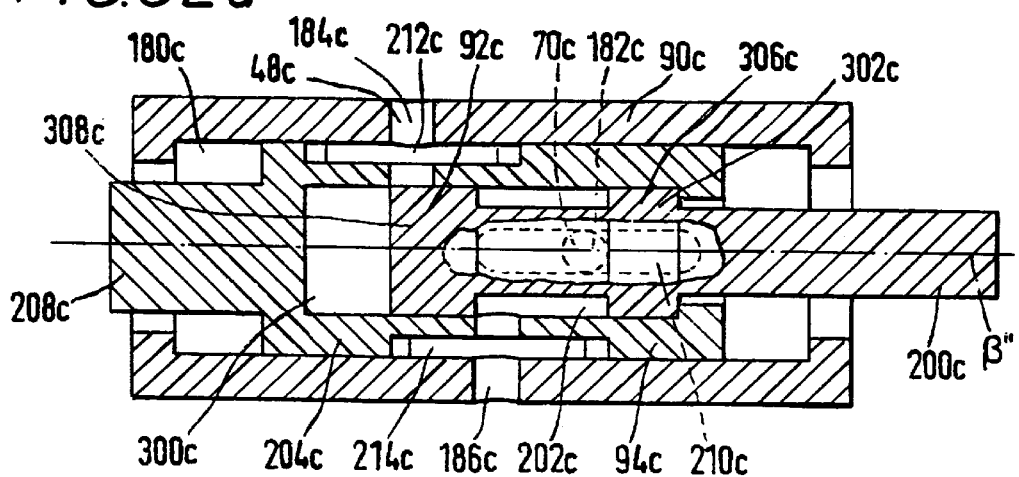
FIG. 32 shows, in FIG. 32a, a section through the control valve of FIG. 31, only partially corresponding to the section shown there, in a basic state position without clutch actuation, and, in FIG. 32b, the section in an actuating position for clutch actuation.
Figure 32B:
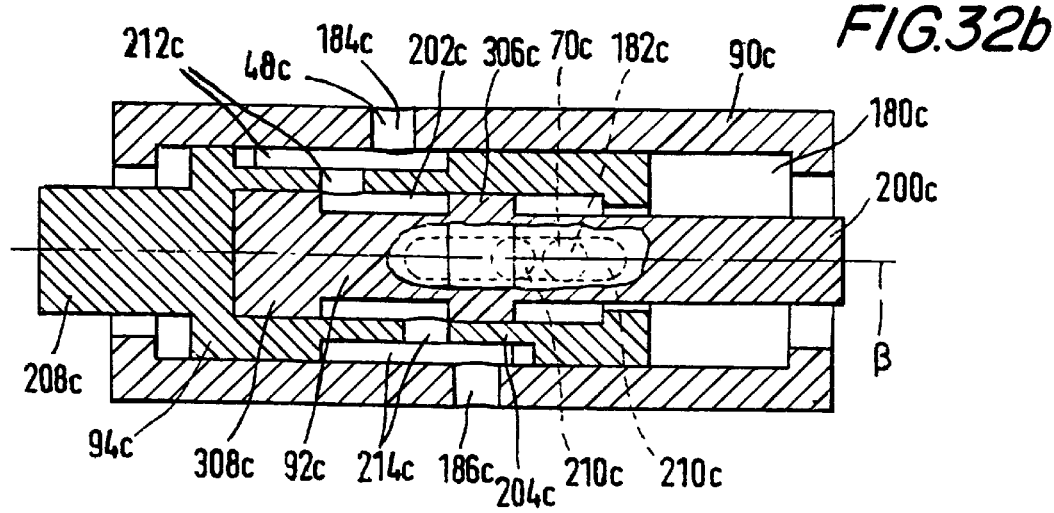

When the control valve is in the basic position shown in FIG. 32a, in which the clutch is not disengaged, there is a venting connection between the bore 186c and the bore 182c via the annular duct 202c. If the first valve element 92c is displaced to the left, as shown in the illustration in FIG. 32, according to a command variable which increases, for example, due to clutch pedal actuation, then the radially inner bore of the perforation 210c is first closed by the closing portion 302c, before the closing portion 308c, which closed the radially inner bore of the perforation 212c in the basic position, has moved past this radially inner bore until a pressure-medium connection is made between the bores 186c and 184c in the control valve housing 90c via the perforations 212c, 214c and the annular duct 202c and pressure medium is supplied to the power cylinder arrangement. FIG. 32b shows the control valve in a state of maximum clutch actuation, in which such a pressure-medium connection between the bores 184c and 186c is made.

In the event of nonmaximum clutch actuation, when the actual value is equal to the command variable, the two valve elements assume an axial relative position such that the closing portion 306c closes the radially inner bore of the perforation 210c and the closing portion 308c closes the radially inner bore of the perforation 212c, so that there is no pressure-medium connection between the pressure-medium power cylinder arrangement, on the one hand, and either the pressure equalizing orifice 70c or the bore 184c leading to the pressure-medium supply, on the other hand.

With the exception of said bores and perforations in the valve housing 90c and in the second valve element 94c, the valve housing and the two valve elements 92c and 94c are designed essentially rotationally symmetrically to the valve axis B". However, rotary position fixing means, not shown in the Figures, which break through the rotational symmetry, are provided, these preventing relative rotation between the second valve element 94c and the valve housing 90c, thereby always ensuring that the perforation 210c is open to the bore 182c, the perforation 214c is open to the bore 186c and the perforation 212c is open to the bore 184c. As already mentioned, the bores 182c, 186c, and 184c and, correspondingly, also the perforations 210c, 214c and 212c, in addition to being offset relative to one another in the axial direction, are also offset relative to one another in the circumferential direction (with respect to the valve axis B"), in order to keep the control valve short in the axial direction. In principle, the bores 182c to 186c and, correspondingly, the perforations 210c to 214c could also be "drawn out" axially, in such a way that the elongate recesses of the perforations, which extend in the axial direction, no longer overlap one another, as seen in a projection onto the valve axis B", so that, instead of the elongate recesses, annular ducts in the manner of the annular duct 202c could be provided on the outer circumference of the second valve element 94c. In this case, the second valve element 94c could assume any desired rotary position relative to the valve housing 90c, as also applies to the first valve element (also in the exemplary embodiment of FIGS. 31 and 32).

In conclusion, the invention relates to an actuating device for a friction clutch arranged in the drivetrain of an automobile between an internal combustion engine and a gear in a casing bell, said actuating device comprising a disengagement bearing arrangement and a positioning servo arrangement, having a pressure-medium power cylinder arrangement, for the disengagement bearing arrangement, the positioning servo arrangement having a control valve connected to a pressure-medium source. The control valve comprises a valve arrangement which can be changed over between at least two control states as a function of an actual value representing the axial position of the disengagement bearing arrangement and of a command variable representing a desired position of the disengagement bearing arrangement. In a first control state, there is a pressure-medium connection between the pressure-medium power cylinder arrangement and the pressure-medium source and, in a second control state, there is a pressure-medium connection between the pressure-medium power cylinder arrangement and a pressure equalizing orifice. The valve arrangement comprises two valve elements movable relative to one another and relative to a valve housing, the command variable being represented by the position of a first of the two valve elements and the actual value by the position of a second of the two valve elements relative to the valve housing, and a difference quantity assigned to the actual value and to the command variable being represented by the position of the two valve elements relative to one another.

What is claimed is:

1. An actuating device (10) for a friction clutch arranged in the drive train of an automobile, in particular a utility automobile, between an internal combustion engine and a gear in a casing bell (12), said actuating device comprising
   a disengagement bearing arrangement (32) for actuating the friction clutch, said disengagement bearing arrangement being movable essentially coaxially to the friction clutch;
   a positioning servo arrangement with a pressure-medium power cylinder arrangement (14) which acts on the disengagement bearing arrangement (32) and can be actuated, via a control valve (42) connected to a pressure-medium source (51), as a function of a command variable representing a desired position and of an actual value representing the axial position of the disengagement bearing arrangement (32);
   the pressure-medium power cylinder arrangement (14), comprising, in particular, an annular pressure-medium cylinder (16) essentially concentric to the clutch axis, being arranged inside the casing bell (12) and being designed preferably for exerting on the disengagement bearing arrangement (32) a force which is essentially coaxial to the clutch axis (A),
   the control valve (42) comprising a valve arrangement which is adjustable between a first control state, connecting the pressure-medium power cylinder arrangement (14) to the pressure-medium source (51), and a second control state, connecting the pressure-medium power cylinder arrangement (14) to a pressure equalizing orifice (70), and which can be changed over between the two control states as a function of a difference quantity assigned to the actual value and to the command variable, the valve arrangement comprising two valve elements (92, 94) moveable relative to one another and relative to a valve housing, and the command variable being represented by the position of a first (92) of the two valve elements and the actual value by the position of a second (94) of the two valve elements relative to the valve housing (40; 90) and the difference quantity being represented by the position of the two valve elements (92, 94) relative to one another.

2. An actuating device (10) for a friction clutch arranged in the drive train of a automobile, in particular a utility automobile, between an internal combustion engine and a gear in a casing bell (12), said actuating device comprising
   a disengagement bearing arrangement (32) for actuating the friction clutch, said disengagement bearing arrangement being movable essentially coaxially to the friction clutch;
   a positioning servo arrangement with a pressure-medium power cylinder arrangement (14) which acts on the disengagement bearing arrangement (32) and can be actuated, via a control valve (42) connected to a pressure-medium source (51), as a function of a command variable representing a desired position and of an actual value representing the axial position of the disengagement bearing arrangement (32);
   the control valve (42) comprising a valve arrangement which is adjustable between a first control state, connecting the pressure-medium power cylinder arrangement (14) to the pressure-medium source (51), and a second control state, connecting the pressure-medium power cylinder arrangement (14) to a pressure equalizing orifice (70), and which can be changed over between the two control states as a function of a difference quantity assigned to the actual value and to the command variable, the valve arrangement comprising two valve elements (92, 94) movable relative to one another and relative to a valve housing, and the command variable being represented by the position of a first (92) of the two valve elements and the actual value by the position of a second (94) of the two valve elements relative to the valve housing (40;90), and the difference quantity being represented by the position of the two valve elements (92, 94) relative to one another.

3. The actuating device as claimed in claim 1, wherein the valve arrangement is adjustable as a function of the difference quantity into a third control state in which the pressure-medium power cylinder arrangement is closed off so as to be essentially pressure medium tight.

4. The actuating device as claimed in claim 1, wherein the control valve (42) has a first signal connection (54) for receiving a command signal indicating the command variable, in particular from a clutch pedal arrangement (60), and a second signal connection (76) for receiving an actual value signal indicating the actual value from an encoder element arrangement (72) assigned to the disengagement bearing arrangement (32).

5. The actuating device as claimed in claim 4, wherein the command signal and the actual value signal act directly, in each case independently of the other signal, on exactly one valve element of the two valve elements, the command signal on the first valve element (92) and the actual value signal on the second valve element (94).

6. The actuating device as claimed in claim 4, wherein the actual value signal is a hydraulic, pneumatic, mechanical or electric signal represented, in particular, by a pressure, a volume, a force, a travel, an angle, a current intensity or a voltage, converter means (420n; 420p; 420t) for converting the actual value signal into the actual value being assigned, where appropriate, to the second signal connection (76).

7. The actuating device as claimed in claim 6, wherein the converter means (420n; 420p; 420t) for converting a pneumatic or hydraulic actual value signal comprise an, in particular, spring-prestressed piston (94n; 94p; 94t) which is preferably coupled or couplable to the second valve element (94n; 94p; 94t), in particular is integral with the latter.

8. The actuating device as claimed in claim 1, wherein the positioning servo arrangement comprises a mechanical position regulating arrangement (42, 64, 16, 72, 74) with a mechanically coupled or couplable encoder element (72; 226b; 450d; 486r; 486s) which records the position of the disengagement bearing arrangement (32) directly or indirectly.

9. The actuating device as claimed in claim 8, wherein the encoder element (72; 226b; 450d; 486r; 486s) acts on the second valve element (94b; 94d; 94r; 94s), in particular is motionally coupled or motionally couplable to the latter.

10. The actuating device as claimed in claim 9, wherein the second valve element (94q) is coupled or couplable, preferably essentially rigidly, to the disengagement bearing arrangement or the disengagement bearing arrangement side of the pressure-medium power cylinder arrangement via a coupling element (94q) which, where appropriate, is integral with said valve element.

11. The actuating device as claimed in claim 9, wherein the second valve element (94b; 94r; 486s) is coupled or couplable to the disengagement bearing arrangement or disengagement bearing arrangement side (162b) of the pressure-medium power cylinder arrangement via a coupling element (226b; 486r; 486s) which is coupled preferably essentially rigidly to said valve element and, where appropriate, is integral with the latter and which is prestressed or prestressable against said disengagement bearing arrangement or disengagement bearing arrangement side.

12. The actuating device as claimed in claim 4, wherein the command signal is a hydraulic, pneumatic, electric or optical signal represented, in particular, by a pressure, a volume, a force, a travel, an angle, a current, a voltage or a light intensity, converter means (234b; 420d; 420r; 420s) for converting the command signal into the command variable being assigned, where appropriate, to the first signal connection (54).

13. The actuating device as claimed in claim 12, wherein the converter means for converting a pneumatic or hydraulic command signal comprise an, in particular, spring-prestressed piston (236b; 92d; 92r; 92s) which is preferably coupled or couplable to the first valve element (92b; 92d; 92r; 92s), in particular is integral with the latter.

14. The actuating device as claimed in claim 1, wherein, of the elements, namely the first valve element (92) and second valve element (94), one (94b; 92c; 94d) has at least one portion (224b; 306c; 308c) which forms a control edge and which cooperates with at least three pressure-medium orifices (70b, 184b, 202b; 210c, 212c, 214c; 442d, 444d, 430d) in the other valve element (92b; 94c; 92d) and in the valve housing (90b; 90c; 90d), in particular one pressure-medium orifice (202b) in the other valve element (92b) and two pressure-medium orifices (70b, 184b) in the valve housing, in order, in at least one relative position of the two valve elements (92b, 94b; 92c, 94c; 92d, 94d), during a movement of the one valve element relative to the other valve element in one direction, by the movement of at least one control edge (224b; 306c, 308c) past at least one of the pressure-medium orifices, in particular the pressure-medium orifice (202b) in the other valve element (92b), to break or make a first pressure-medium connection within a control valve, in particular the pressure-medium connection between the pressure-medium source (51b) and the pressure-medium power cylinder arrangement (14b), and to make or break another pressure-medium connection within the control valve (42b; 42c; 42d), in particular the pressure-medium connection between the pressure equalizing orifice (70b; 70c; 70d) and the pressure-medium power cylinder arrangement (14b).

15. The actuating device as claimed in claim 14, wherein the second valve element (94b; 94d) has at least one portion (224b) forming a control edge.

16. The actuating device as claimed in claim 14, wherein the first valve element (92d) has at least one portion forming a control edge.

17. The actuating device as claimed in claim 1, wherein one of the valve elements (namely the first valve element (92b; 92d) and second valve element (94b; 94d)) has at least one in particular studlike fitting portion (220b; 450d) which fits into an associated slotlike recess (222b; 452d) of the other valve element (94b; 92d), the recess (222b; 452d) being delimited by a recess edge forming at least one stop, where appropriate with two stops delimiting the recess at both ends, in order to limit the range of movement of the two valve elements (92b, 94b; 92d, 94d) relative to one another.

18. The actuating device as claimed in claim 17, wherein the first valve element (92b) has the at least one fitting portion (220b).

19. The actuating device as claimed in claim 17, wherein the second valve element (94d) has the at least one fitting portion (450d).

20. The actuating device as claimed in claim 1, wherein the second valve element (94b; 94d) is coupled to the first valve element (92b; 92d) in such a way that, when the actuating device is in a basic state without clutch actuation, the second valve element (94b; 94d) holds the first valve element (92b; 92d) in an initial position relative to the second valve element (94b; 94d), said initial position preferably taking any clutch wear into account, in order, at the start of clutch actuation, to provide a defined response of the actuating device and/or at least to keep small, preferably avoid, an idle travel induced, in particular, by clutch wear.

21. The actuating device as claimed in claim 20, wherein, in order to hold the first valve element (92b; 92d) in the initial position, the two valve elements (92b, 94b; 92d, 94d) have cooperating stops, in particular in the form of the at least one fitting portion (220b; 450d) and of the recess edge delimiting the recess (222b; 452d).

22. The actuating device as claimed in claim 1, wherein, when the actuating device is in a basic state without clutch actuation, the control valve (42) assumes the control state connecting the pressure equalizing orifice (70) to the pressure-medium power cylinder arrangement (14).

23. The actuating device as claimed in claim 1, wherein the first (92b; 92d) and the second (94b; 94d) valve element are mounted in a recess (180b; 180d) of the valve housing (90b; 90d), one of the valve elements being rotatable about a valve axis (B'; B") and the other valve element being either rotatable about the valve axis (B'; B") or displaceable along the valve axis (B'; B"), either the actual value and the command variable both being represented by a rotary position of the respective valve element (92b; 94b) or one of these quantities being represented by a rotary position and the other of these quantities by an axial position of the respective valve element (92d; 94d).

24. The actuating device as claimed in claim 23, wherein, of the elements, namely the first valve element (92b; 92d) and second valve element (94b; 94d), one valve element has at least two separate pressure-medium passage orifices (210b, 212b; 442d; 444d), of which one passage orifice is in pressure-medium passage connection with a first pressure-medium passage orifice (70b; 70d) of the valve housing (90b; 90d) in at least one position of this valve element (94b; 92d) relative to the valve housing (90b; 90d) and the other passage orifice is in pressure-medium passage connection with a second pressure-medium passage orifice (148b; 48d) of the valve housing (90b; 90d) in at least one position of this valve element (94b; 92d) relative to the valve housing (90b; 90d), and wherein at least one further pressure-medium passage orifice (202b; 440d) is provided in the other valve element (92b; 94d), at least one further pressure-medium passage orifice (202b; 440d) being in pressure-medium passage connection with a third pressure-medium passage orifice (186b; 430d) of the valve housing (90b; 90d) in at least one position of the other valve element (92b; 94d) relative to the valve housing (90b; 90d).

25. The actuating device as claimed in claim 24, wherein, in a first relative position or in a first relative position range of the two valve elements (92b, 94b; 92d, 94d) to one another, the one further pressure-medium passage orifice (202b; 440d) in the other valve element (92b; 94d) is in pressure-medium passage connection with one (220b; 442d) of the at least two separate pressure-medium passage orifices in the one valve element (94b; 92d), and wherein, in a second relative position or in the second relative position range of the two valve elements (92b, 94b; 92d, 94d) to one another, the one further pressure-medium passage orifice (202b; 440d) in the other valve element (92b; 94d) is in pressure-medium passage connection with another (212b; 444d) of the at least two separate pressure-medium passage orifices in the one valve element (94b; 92d).

26. The actuating device as claimed in claim 24, wherein a pressure-medium connection between the pressure-medium source (51b) and the pressure-medium power cylinder arrangement (14b) is made in at least one position range of the two valve elements (92b, 94b; 92d, 94d) relative to one another and relative to the valve housing (90b; 90d) via associated pressure-medium passage orifices (184b, 186b, 212b, 202b, 214b; 48d, 430d, 442d, 440d) in the valve housing and in the two valve elements, and wherein a pressure-medium connection between the pressure-medium power cylinder arrangement (14b) and the pressure equalizing orifice (70b; 70d) is made in at least one other position range of the two valve elements (92b, 94b; 92d, 94d) relative to one another and relative to the valve housing (90b; 90d) via associated pressure-medium passage orifices (210b, 202b, 214b, 186b; 430d, 444d, 440d) in the valve housing and in the two valve elements.

27. The actuating device as claimed in claim 24, wherein, in a third relative position or in a third relative position range of the two valve elements (92b, 94b; 92d, 94d) to one another, the one further pressure-medium passage orifice (202b; 440d) in the other valve element is not in pressure-medium passage connection with either of the at least two separate pressure-medium passage orifices in the one valve element.

28. The actuating device as claimed in claim 24, wherein, in at least one position of the two valve elements (92b, 94b; 92d, 94d) relative to one another and relative to the valve housing (90b; 90d), neither a pressure-medium connection between the pressure-medium power cylinder arrangement (14b) and the pressure-medium source (51b) nor a pressure-medium connection between the pressure-medium power cylinder arrangement (14b) and the pressure equalizing orifice (70b; 70d) is made.

29. The actuating device as claimed in claim 23, wherein, of the elements, namely the first valve element (92b; 92d) and second valve element (94b; 94d), one valve element (94b; 92d) has an annular portion (204b; 412d) which is coaxial to the valve axis (B'; B") and which radially surrounds the other valve element (92b; 94d) of the two valve elements externally, at least in regions.

30. The actuating device as claimed in claim 29, wherein the other valve element (94d) of the two valve elements has an annular portion (414d) which is coaxial to the valve axis (B") and which radially surrounds an inner portion (408d) of the valve housing (90d) externally, at least in regions, said inner portion preferably having at least one pressure-medium passage orifice (430d, 432d).

31. The actuating device as claimed in claim 29, wherein a valve housing wall (90b; 400d), radially surrounding the one valve element (94b; 92d) externally and at least partially delimiting the recess of the valve housing, and/or the annular portion (204b; 412d), coaxial to the valve axis (B"), of the one (94b; 92d) valve element and/or the annular portion (414d), coaxial to the valve axis (B"), of the other valve element (92b; 94d) have at least one respective pressure-medium passage orifice (70b, 184b, 186b, 210b, 212b, 214b; 48d, 70d, 442d, 444d, 440d).

32. The actuating device as claimed in claim 1, wherein the first (92b) and the second (94b) valve element are mounted rotatably about a valve axis (B") in a recess (180b) of the valve housing (90b), the actual value and the command variable being represented by rotary positions of the respective valve element (92b; 94b).

33. The actuating device as claimed in claim 32, wherein the second valve element (94b) has the annular portion (204b) which is coaxial to the valve axis (B") and which radially surrounds the first valve element (92b) externally, at least in regions.

34. The actuating device as claimed in claim 32, wherein the annular portion (204b) of the one valve element (94b), said annular portion being radially surrounded externally by a recess (180b)—delimiting inner circumferential surface of the valve housing (90b), has, as pressure-medium passage orifices, at least two perforations (210b, 212b, 214b) which extend in the circumferential direction, are offset relative to one another in the circumferential direction and are separated from one another by means of a respective portion (224b; 240b; 242b) of the annular portion (204b) and which are open radially inwardly and radially outwardly, wherein at least two in particular radially directed bores (182b, 184b, 186b) opening into the recess (182b) are provided in the valve housing (90b) as pressure-medium passage orifices, the opening orifices of the bores being offset relative to one another in the circumferential direction and in each case at least partially covering another of the perforations in at least one rotary position of the one valve element (94b), and wherein at least one connecting duct is provided in the other valve element (92b) as a pressure-medium passage orifice, in particular a passage bore (202b), said connecting duct being open to two of the perforations in at least one relative rotary position of the two valve elements (92b, 94b), in particular in that the two opening orifices of the passage bore (202b) are at least partially covered in each case by another of the perforations.

35. The actuating device as claimed in claim 34, wherein in each case exactly three bores (182b, 184b, 186b), in each case exactly three perforations (210b, 212b, 214b) and exactly one connecting duct, in particular a radially extending passage bore (202b), are provided, a pressure-medium connection between the pressure-medium source (51b) and the pressure-medium power cylinder arrangement (14b) being made in at least one rotary position range of the two valve elements (92b, 94b) relative to one another and relative to the valve housing (90b) via two (184b, 186b) of the bores, two (212b, 214b) of the perforations and the connecting duct (202b), and a pressure-medium connection between the pressure-medium power cylinder arrangement (14b) and the pressure equalizing orifice (70b) being made in at least one other rotary position range of the two valve elements (92b, 94b) relative to one another and relative to the valve housing (90b) via two (182b, 186b) of the bores, two (210b, 214b) of the perforations and the connecting duct (202b).

36. The actuating device as claimed in claim 34, wherein those portions (224b, 240b, 242b) of the annular portion (204b) which separate the perforations (210b, 212b, 214b) from one another are dimensioned in such a way that, in at least one relative rotary position of the two valve elements (92b, 94b) to one another and/or in at least one rotary position of the one valve element (94b) relative to the valve housing (90b), at least one duct orifice of the connecting duct, in particular opening orifice of the passage bore (202b), in the other valve element (92b) and/or at least one of the opening orifices of the bores in the valve housing (90b) is closed by a respective portion (224b) of the annular portion (204b), said portion forming, in particular, a control edge.

37. The actuating device as claimed in claim 35, wherein the opening orifices of the three bores (182b, 184b, 186b), said opening bores preferably being essentially not offset relative to one another in the axial direction, are arranged at a distance from one another at the same circumferential angle and preferably in each case cover an identical circumferential angle range.

38. The actuating device as claimed in claim 35, wherein the three perforations (210b, 212b, 214b), preferably essentially not offset relative to one another in the axial direction, in each case cover an identical circumferential angle range and are arranged at a distance from one another at the same circumferential angle.

39. The actuating device as claimed in claim 37, wherein, of the three bores, a bore (182b) assigned to the pressure equalizing orifice (70b), a bore (184b) assigned to the pressure-medium source (51b) and a bore (186b) assigned to the pressure-medium power cylinder arrangement (14b) succeed one another in a predetermined direction of rotation, in the basic state of the actuating device (lob) an opening orifice of the passage bore (202b) in the first valve element (92b) being located approximately opposite the bore (182b) assigned to the pressure equalizing orifice (70b), a portion (240b) of the annular portion (204b) of the second valve element (94b), said portion forming a control edge, being offset in the direction of rotation relative to the bore (182b) assigned to the pressure equalizing orifice (70b), but being closely adjacent to said bore, and, for the actuation of the clutch, the first valve element (92b) being rotatable in the direction of rotation relative to the rotary position of the basic state, in particular at most approximately as far as a rotary position in which the opening orifice of the passage bore (202b) is located approximately opposite the bore (184b) assigned to the pressure-medium source (51b).

40. The actuating device as claimed in claim 32, wherein the recess is designed as a passage bore (180b) which runs preferably transversely to the direction of movement of the disengagement bearing arrangement and is located in the valve housing (92b) and at one end of which the first valve element (92b) is accessible, in particular projects, and at the other end of which the second valve element (94b) is accessible, in particular projects.

41. The actuating device as claimed in claim 40, wherein an end portion (206b) of the second valve element (94b), said end portion projecting from the passage bore (180b) in the valve housing (90b), carries, as a coupling element, a rigidly coupled caliper (226b) which acts on the disengagement bearing arrangement or the disengagement bearing arrangement side (162b) of the pressure-medium power cylinder arrangement (14b), in particular by spring means (238b) acting on the caliper (226b) and the valve housing (90b), and preferably comprising a leg spring (238b) arranged around the end portion (208b), and is prestressed against said disengagement bearing arrangement or disengagement bearing arrangement side, a linear movement of the disengagement bearing arrangement or the disengagement bearing arrangement side (162b) of the pressure-medium power cylinder arrangement (14b) being capable of being converted into a rotational movement of the second valve element (94b) via the caliper (226b).

42. The actuating device as claimed in claim 40, wherein the spring-prestressed piston (236b) of the converter means is part of a cylinder/piston arrangement (234b) separate from the valve elements (92b, 94b), the piston (236b) being movable preferably in a direction which runs essentially transversely to the valve axis (B'), and a linear movement of the piston (236b) being capable of being converted into a rotational movement of the first valve element (92b) via a deflecting arrangement, in particular toggle lever arrangement (230b, 232b), acting on the first valve element (92b).

43. The actuating device as claimed in claim 1, wherein the first (92d) and the second (94d) valve element are mounted in a recess (180d) of the valve housing (90d), one of the valve elements being rotatable about a valve axis (B") and the other valve element being displaceable along the valve axis (B"), one quantity of the actual value and the command variable being represented by a rotary position and the other quantity by an axial position of the respective valve element (92d; 94d).

44. The actuating device as claimed in claim 43, wherein the first valve element (92d) has the annular portion (412d) which is coaxial to the valve axis (B") and which radially surrounds the second valve element (94d) externally, at least in regions.

45. The actuating device as claimed in claim 44, wherein the valve element displaceable along the valve axis (B"), in particular the first valve element (92d) is secured against rotation about the valve axis (B"), and/or wherein the valve element rotatable about the valve axis (B"), in particular the second valve element (94d), is secured against displacement along the valve axis (B").

46. The actuating device as claimed in claim 43, wherein, of the elements, namely the first valve element (92d) and second valve element (94d), one valve element, in particular the first valve element (92d), has, as pressure-medium passage orifices, at least two holes (442d, 444d), in particular bores, offset relative to one another in the circumferential direction and/or in the axial direction, and wherein the other valve element has, as a pressure-medium passage orifice, at least one long hole (440d) which cooperates with the holes (442d, 444d) in order to implement the valve control states and which extends both in the circumferential direction and in the axial direction, preferably runs obliquely to an axially parallel generating line of the valve element (92d).

47. The actuating device as claimed in claim 46, wherein the control valve, in particular the valve housing and/or the first valve element (92d) and/or the second valve element, has pressure-medium guide means (446d, 448d) which ensure a pressure-medium passage connection between pressure-medium passage orifices (442d and 48d; 444d and 70d) assigned to one another in pairs in the valve housing (90d), on the one hand, and in one of the two valve elements (92d), on the other hand, regardless of the position of this valve element (92d) relative to the valve housing (90d).

48. The actuating device as claimed in claim 47, wherein the pressure-medium guide means comprise at least one pressure-medium guide recess (446d, 448d), running in the axial direction and/or in the circumferential direction, in surface portions of the valve housing, of the first valve element (92d) and of the second valve element which bear one on the other, said recess having a respective pressure-medium passage orifice (442d; 444d) and being in a pressure-medium passage connection with the pressure-medium passage orifice (48d or 70d) assigned in pairs to this pressure-medium passage orifice, regardless of the position of the respective valve element (92d).

49. The actuating device as claimed in claim 47, wherein the pressure-medium guide means comprise at least one inner space (460s; 460t) which is formed in the control valve and is at least partially delimited by at least two elements of the valve housing (90s; 90t), namely the first valve element and second valve element (94s; 94t), and into which the pressure-medium passage orifices (48s and 440s; 48t and 440t) assigned to one another in pairs open, regardless of the position of the respective valve element.

50. The actuating device as claimed in claim 43, wherein a pressure-medium connection between the pressure-medium source and the pressure-medium power cylinder arrangement is made in at least one position range of the two valve elements (92d, 94d) relative to one another and relative to the valve housing (90d) via exactly two pressure-medium passage orifices (48d, 430d) in the valve housing (90d), exactly one pressure-medium passage orifice (442d) in the first valve element (92d) and exactly one pressure-medium passage orifice (440d) in the second valve element (94d), and a pressure-medium connection between the pressure-medium power cylinder arrangement and the pressure equalizing orifice (70b) is made in at least one other position range of the two valve elements (92d, 94d) relative to one another and relative to the valve housing (90d) via exactly two pressure-medium passage orifices (70d, 430d) in the valve housing (90d), exactly one pressure-medium passage orifice (444d) in the first valve element (92d) and exactly one pressure-medium passage orifice (440d) in the second valve element (94d).

51. The actuating device as claimed in claim 1, wherein the control valve has prestressing means (424d) which prestress at least one (92d) of the two valve elements in one direction, preferably in a direction of a position corresponding to a basic state of the actuating device without clutch actuation.

52. The actuating device as claimed in claim 1, wherein the second valve element (94d) has at least one portion (450d) accessible from outside the valve housing (90d) or a coupling element connected to this valve element and led out of the valve housing (90d) is provided, the accessible portion (450d) or the coupling element serving for motionally coupling the second valve element (94d) to the disengagement bearing arrangement or the disengagement bearing arrangement side of the pressure-medium power cylinder arrangement.

53. The actuating device as claimed in claim 1, wherein the first valve element (92n; 92p; 92q; 92t) has at least one portion accessible from outside the valve housing or a coupling element (480p, 450q) connected to this valve element and led out of the valve housing is provided, the accessible portion or the coupling element serving for moving the first valve element according to the command variable.

54. The actuating device as claimed in claim 1, wherein the first valve element (92d) and the second valve element (94d) are designed as cylindrical bodies or cylindrical hollow bodies, in particular circular-cylindrical bodies or circular-cylindrical hollow bodies, capable of being introduced one into the other.

55. The actuating device as claimed in claim 1, wherein the valve housing (90d) comprises an inner housing part (402d) and an outer housing part (400d) having the recess (180d) which receives the valve elements (92d, 94d), the inner housing part (402d) preferably having a cylindrical portion (408d), in particular a circular-cylindrical portion, which can be introduced into the valve elements (92d, 94d).

56. The actuating device as claimed in claim 43, wherein the valve element (92d) displaceable along the valve axis (B") has an, where appropriate, polygonal stud portion (422d) which is preferably coaxial to the valve axis (B") and which can be introduced into an associated cross-sectionally adapted orifice of a housing portion (408d), in particular the inner housing part (402d), in order to secure this valve element (92d) against rotation.

57. The actuating device as claimed in claim 43, wherein the valve element displaceable along the valve axis and an adjacent housing portion have groove and tongue means which secure this valve element against rotation.

58. The actuating device as claimed in claim 43, wherein, in order to limit the range of movement of the valve elements (92d, 94d) relative to one another and/or to hold the first valve element (92d) in the initial position when the actuating device assumes the basic state, one (92d) of the two valve elements has a recess (452d), in particular a long hole (452d) which runs in the axial and circumferential directions, where appropriate obliquely to an axially parallel generating line of the valve element, and into which the fitting portion (450d) of the other valve element (94d) fits, said fitting portion preferably serving as a coupling element.

59. The actuating device as claimed in claim 58, wherein the profile of the recess (452d) is adapted to the profile of the long hole (440d) serving as a pressure-medium passage orifice, in order, on the one hand, to provide a defined response of the actuating device, irrespective of any clutch wear, and/or at least keep small an idle travel induced, in particular, by clutch wear and, on the other hand, to provide a range of movement of the valve elements (92d, 94d) relative to one another which is necessary for implementing the control states.

60. The actuating device as claimed in claim 1, wherein surface portions of the valve housing (90b; 90d), of the first (92b; 92d) and of the second (94b; 94d) valve element which bear one on the other are designed as sealing and/or sliding surfaces and/or sealing elements (216b, 218b; 426d, 428d) have a sealing effect between these.

61. The actuating device as claimed in claim 1, wherein the control valve (42) is arranged inside the casing bell (12), but, with the casing bell (12) still being connected to the internal combustion engine and to the gear, is accessible, in particular removable, from outside.

62. The actuating device as claimed in claim 1, wherein the disengagement direction of the pressure-medium power cylinder arrangement (14) and the disengagement direction of the friction clutch are essentially parallel to one another, the clutch axis (A) and the power cylinder arrangement axis (A) preferably essentially coinciding.

63. The actuating device as claimed in claim 1, wherein the valve axis (B', B") and the power cylinder arrangement axis (A) do not have any point in common.

64. The actuating device as claimed in claim 63, wherein the valve axis and the power cylinder arrangement axis are essentially parallel to one another.

65. The actuating device as claimed in claim 63, wherein the valve axis (B') and the power cylinder arrangement axis (A) are essentially orthogonal to one another, as seen in a projection onto a plane essentially parallel to the two axes.

66. The actuating device as claimed in claim 1, wherein the control valve (42) is mounted, in particular releasably, on the pressure-medium power cylinder arrangement (14).

67. The actuating device as claimed in claim 66, wherein a control valve structural unit (40) comprising the control valve (42) is offset, relative to a power cylinder structural unit (14) comprising the pressure-medium power cylinder arrangement (14), in a direction which is radial with respect to the power cylinder arrangement axis (A) and is mounted releasably on a radially outer portion of the power cylinder structural unit (14).

68. The actuating device as claimed in claim 67, wherein the control valve structural unit (40) can be removed from the power cylinder structural unit (14) essentially in the radial direction after the release of any fastening and/or coupling means which take effect between the two structural units and which are accessible preferably from at least one radial direction corresponding essentially to the radial direction.

69. The actuating device as claimed in claim 1, wherein the pressure medium is a pneumatic pressure medium.

* * * * *